(12) United States Patent
Jancaitis et al.

(10) Patent No.: US 8,060,630 B1
(45) Date of Patent: Nov. 15, 2011

(54) CREATING AND CONFIGURING VIRTUAL FABRICS IN STORAGE AREA NETWORKS

(75) Inventors: Ryan Jancaitis, Belmont, MA (US); Bruce R. Rabe, Dedham, MA (US)

(73) Assignee: Symantec Operating Corporation, Mountain View, CA (US)

( * ) Notice: Subject to any disclaimer, the term of this patent is extended or adjusted under 35 U.S.C. 154(b) by 2998 days.

(21) Appl. No.: 10/306,211

(22) Filed: Nov. 27, 2002

(51) Int. Cl.
*G06F 15/16* (2006.01)

(52) U.S. Cl. ........ 709/229; 709/224; 709/223; 711/112; 711/170

(58) Field of Classification Search ................. 709/213, 709/214, 223, 229; 711/111, 162, 163; 713/201; 707/10, 9
See application file for complete search history.

(56) References Cited

U.S. PATENT DOCUMENTS

| | | | |
|---|---|---|---|
| 6,085,200 A | 7/2000 | Hill et al. | |
| 6,347,342 B1 | 2/2002 | Marcos et al. | |
| 6,389,432 B1 | 5/2002 | Pothapragada et al. | |
| 6,601,187 B1 | 7/2003 | Sicola et al. | |
| 6,636,239 B1 | 10/2003 | Arquie | |
| 6,654,747 B1 | 11/2003 | Van Huben et al. | |
| 6,671,776 B1 | 12/2003 | DeKoning | |
| 6,697,924 B2 * | 2/2004 | Swank ......................... | 711/163 |
| 6,714,952 B2 | 3/2004 | Dunham et al. | |
| 6,738,821 B1 | 5/2004 | Wilson et al. | |
| 6,807,181 B1 | 10/2004 | Weschler | |
| 6,826,580 B2 | 11/2004 | Harris et al. | |
| 6,839,750 B1 | 1/2005 | Bauer et al. | |
| 6,845,395 B1 * | 1/2005 | Blumenau et al. ........... | 709/223 |
| 6,854,035 B2 | 2/2005 | Dunham et al. | |
| 6,920,494 B2 * | 7/2005 | Heitman et al. ............... | 709/223 |
| 6,940,810 B1 * | 9/2005 | Roa-Diaz ....................... | 370/217 |
| 6,944,654 B1 | 9/2005 | Murphy et al. | |
| 7,068,667 B2 * | 6/2006 | Foster et al. ................... | 370/398 |
| 2002/0095602 A1 | 7/2002 | Pherson et al. | |
| 2002/0161871 A1 | 10/2002 | Shanthaveeraiah et al. | |
| 2002/0194407 A1 | 12/2002 | Kim | |
| 2003/0130821 A1 | 7/2003 | Anslow et al. | |

OTHER PUBLICATIONS

"QLDIRECT QLogic Optimizing and Multipath Driver for Windows NT V4.0 and Windows 2000," (5 Pages), 2000.
"QLogic Software Suite Streamlines SAN Management," FCIA Member Company Press Release, Nov. 9, 1999, (3 Pages).

(Continued)

*Primary Examiner* — Jude Jean Gilles
(74) *Attorney, Agent, or Firm* — Robert C. Kowert; Meyertons, Hood, Kivlin, Kowert & Goetzel, P.C.

(57) ABSTRACT

Embodiments of a mechanism for creating and configuring virtual fabrics in Storage Area Networks (SANs). Embodiments may provide a vendor-neutral mechanism for creating and configuring virtual fabrics in physical SAN fabrics that may include heterogeneous switches. Each virtual fabric may include its own name service, management service, fabric configuration service, zoning service, and/or other fabric services. A vendor-neutral virtual fabric utility may be provided for creating and managing virtual fabrics. In one embodiment, switch ports, switch slots and/or switches may be selected and added to new or existing virtual fabrics using the virtual fabric utility. In one embodiment, SAN components coupled to fabric switches (e.g. hosts, HBAs, HBA ports, storage devices and storage device ports) may be displayed for selection and assignment to the virtual fabric. Switch ports coupled to a selected SAN components may be automatically determined by the virtual fabric utility and added to the virtual fabric.

28 Claims, 11 Drawing Sheets

OTHER PUBLICATIONS

"The Architecture of Veritas SANPoint Control tm 2.0," Veritas Software Corporation, 2001, (42 Pages).

High Availability Storage Networks with the Cisco MDS 9500 Series of Multilayer Directors, Cisco Systems, Aug. 2002, (14 pages).

Scott Lukes, "Building Bulletproof Security When Connecting SANs over WANs, while maintaining gigabit speeds, presents challenges," InfoStor, Mar. 2002, (7 pages).

StorageWorks Fibre Channel SAN Switch 16-EL, Compaq, Mar. 21, 2002, (6 pages).

* cited by examiner

CREATING AND CONFIGURING VIRTUAL FABRICS IN STORAGE AREA NETWORKS

BACKGROUND OF THE INVENTION

1. Field of the Invention

This invention is related to the field of storage management and, more particularly, to software used in storage management.

2. Description of the Related Art

In the past, large organizations relied heavily on parallel SCSI technology to provide the performance required for their enterprise data storage needs. More recently, organizations are recognizing that the restrictions imposed by SCSI architecture are too costly for SCSI to continue as a viable solution. Such restrictions include the following:

- SCSI disk arrays must be located no more than 25 meters from the host server;
- The parallel SCSI bus is susceptible to data errors resulting from slight timing discrepancies or improper port termination; and
- SCSI array servicing frequently requires downtime for every disk in the array.

One solution has been to create technology that enables storage arrays to reside directly on the network, where disk accesses may be made directly rather than through the server's SCSI connection. This network-attached storage (NAS) model eliminates SCSI's restrictive cable distance, signal timing, and termination requirements. However, it adds a significant load to the network, which frequently is already starved for bandwidth. Gigabit Ethernet technology only alleviates this bottleneck for the short term, so a more elegant solution is desirable.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices. The versatility of the SAN model enables organizations to perform tasks that were previously difficult to implement, such as LAN-free and server-free tape backup, storage leasing, and full-motion video services.

SUMMARY OF THE INVENTION

Embodiments of a mechanism for creating and configuring virtual fabrics in Storage Area Networks (SANs) including heterogeneous fabric switches are described. Embodiments may be used to create and configure one or more virtual fabrics on top of the same physical hardware infrastructure of a SAN fabric and thus may reduce or eliminate the need to build separate physical fabrics in a SAN environment. Embodiments may provide a vendor-neutral mechanism for creating and configuring logical virtual fabrics in physical SAN fabrics that may include a plurality of heterogeneous SAN fabric switches. "Heterogeneous" includes the notion of switches with different management interfaces, and which may be, but are not necessarily, provided by different vendors.

A virtual fabric and one or more SAN components including, but not limited to, host systems, Host Bus Adapters (HBAs), HBA ports, storage devices, and storage device ports which are coupled to switch ports within the virtual fabric may be considered to collectively form a logical or "virtual" SAN within the physical SAN. Rather than needing multiple sets of one or more switches to implement different SANs, virtual fabrics may be created to support many different virtual SANs from one set of one or more switches. In one embodiment, unlike zones, each virtual fabric is configured with its own name service, management service, fabric configuration service, zoning service, and/or other fabric services as necessary or desired. In one embodiment, to enable the configuration of virtual fabrics in a SAN, the SAN fabric includes switches that include hardware and/or software support for virtual fabrics, including ISL support.

Embodiments may provide a virtual fabric utility for configuring virtual fabrics that may include heterogeneous switches. The virtual fabric utility may be used to create new virtual fabrics and to manage existing virtual fabrics. In one embodiment, using the virtual fabric utility, a user may first create a new virtual fabric or select an existing virtual fabric in a SAN fabric. After creating or selecting a virtual fabric, available switch ports of one or more potentially heterogeneous fabric switches may be displayed for selection. In one embodiment, switches and switch slots, each including a plurality of switch ports, may also be displayed. In one embodiment, other SAN components coupled to the switch ports including one or more of, but not limited to, hosts, HBAs, HBA ports, storage devices and storage device ports may also be displayed. The user may then select one or more of the displayed switch ports, switch slots, and/or switches for addition the virtual fabric. In one embodiment, the selected switch ports, slots and/or switches may be displayed for verification by the user. After verifying the selections, the selected switch ports, slots and/or switches may be added to the virtual fabric.

In one embodiment, after creating or selecting a virtual fabric, components of the SAN including one or more of, but not limited to, hosts, HBAs, HBA ports, storage devices and storage device ports may be displayed for selection and assignment to the virtual fabric. The user may then select one or more of the SAN components for assignment to the virtual fabric. Switch ports coupled to the selected one or more SAN components may then be automatically determined by the virtual fabric utility. In one embodiment, the selected SAN components and/or the determined switch ports may be displayed for verification by the user. After verifying the selections and/or the determined switch ports, the determined switch ports may be added to the virtual fabric.

BRIEF DESCRIPTION OF THE DRAWINGS

The following detailed description makes reference to the accompanying drawings, which are now briefly described.

Figure 1:
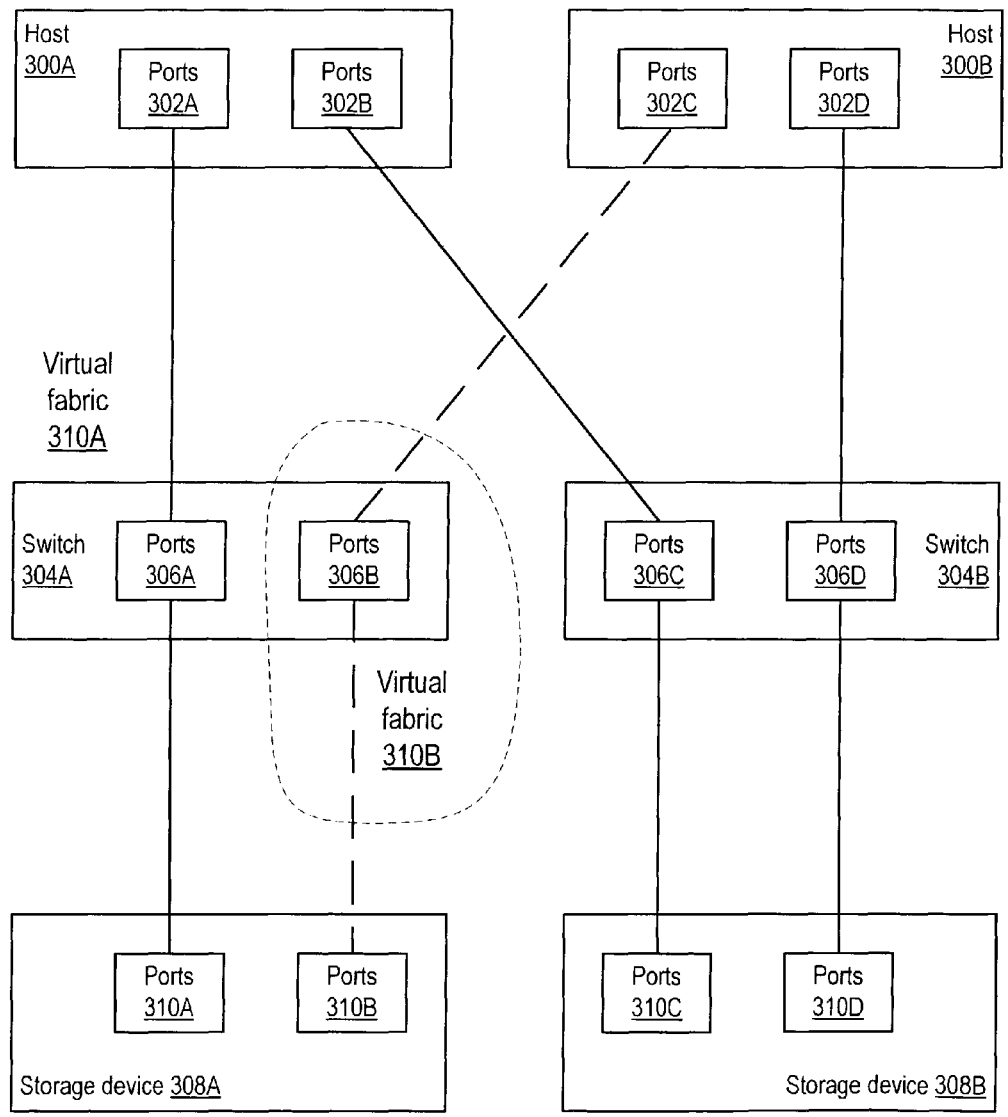
FIG. 1 illustrates an exemplary SAN including two virtual fabrics according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a mechanism for creating and configuring virtual fabrics in Storage Area Networks (SANs) including heterogeneous fabric switches are described. Embodiments may be used to create and configure one or more virtual fabrics on top of the same physical hardware infrastructure of a SAN fabric and thus may reduce or eliminate the need to build separate physical fabrics in a SAN environment. Embodiments may provide a vendor-neutral mechanism for creating and configuring logical virtual fabrics in physical SAN fabrics that may include a plurality of heterogeneous SAN fabric switches. "Heterogeneous" includes the notion of switches with different management interfaces, and which may be, but are not necessarily, provided by different vendors.

A virtual fabric and one or more SAN components including, but not limited to, host systems, Host Bus Adapters (HBAs), HBA ports, storage devices, and storage device ports which are coupled to switch ports within the virtual fabric may be considered to collectively form a logical or "virtual" SAN within the physical SAN. Rather than needing multiple sets of one or more switches to implement different SANs, virtual fabrics may be created to support many different virtual SANs from one set of one or more switches. An example of this is storage service providers that provide storage as a product; using virtual fabrics, specific storage may be dynamically separated on their networks without adding more switches or physical fabrics.

Virtual SANs may provide one or more benefits in a SAN environment, and virtual fabrics may be created and managed using embodiments of a mechanism for configuring and managing virtual fabrics in SANs including heterogeneous fabric switches to take advantage of any one or a combination of these benefits. These benefits may include one or more of, but are not limited to, the following. In the same SAN hardware infrastructure, separate virtual SANs for separate groups may be configured. For example, a development virtual SAN and a product marketing virtual SAN may be configured in a SAN to separate functional aspects of an enterprise. As another example, a "main" virtual SAN and a "backup" virtual SAN may be configured in a SAN to provide a redundant SAN configuration in case of failure. Virtual SANs preferably provide scalability. Virtual SANs preferably provide security for network resources. Separate virtual fabrics may be created to ensure only authorized users are able to access designated storage.

In one embodiment, creation of a virtual fabric may be performed by a mechanism that combines virtual switches connected by an inter-switch link (ISL). In one embodiment, to enable the configuration of virtual fabrics in a SAN, the SAN fabric includes switches that include hardware and/or software support for virtual fabrics, including ISL support. As an example of a virtual fabric configuration, a first switch in a fabric may include 64 ports. Twelve of the ports may be configured in a first virtual fabric. A second switch may include 22 ports configured in the first virtual fabric. A third switch may include three ports configured in the first virtual fabric. One or more other virtual fabrics may be configured that each includes one or more ports from one or more of the three switches and/or from other switches in the fabric. In one embodiment, unlike zones, each virtual fabric is configured with its own name service, management service, fabric configuration service, zoning service, and/or other fabric services as necessary or desired. Each virtual fabric may, in turn, include one or more zones.

FIG. 1 illustrates an exemplary SAN including two virtual fabrics according to one embodiment. For one embodiment, a SAN may be described as a high-speed, special-purpose network that interconnects storage devices (e.g. storage devices 308A and 308B) with associated data servers (e.g. hosts 300A and 300B) on behalf of a larger network of users. A SAN may include one or more hosts 300 (e.g. hosts 300A and 300B), one or more storage devices 308 (e.g. storage devices 308A and 308B), and one or more SAN fabrics each including one or more potentially heterogeneous switches 304 and potentially other SAN fabric components. SAN fabrics may enable host-to-storage device connectivity through Fibre Channel switching technology. SAN fabric hardware may include one or more one or more potentially heterogeneous switches 304, and may also include bridges, hubs, or and other devices such as routers, as well as the interconnecting cables (for Fibre Channel SANs, fibre optic cables). A SAN may also include one or more administration systems (not shown). One or more end-user platforms (not shown) may access the SAN, typically via a LAN or WAN connection to one or more of the hosts 300.

Storage devices 308 may include, but are not limited to, RAID (Redundant Array of Independent Disks) systems, disk arrays, JBODs (Just a Bunch Of Disks, used to refer to disks that are not configured according to RAID), tape devices, and optical storage devices. Hosts 300 may run any of a variety of operating systems, including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host 300 is typically connected to the SAN fabric via one or more Host Bus Adapters (HBAs).

In this example, switch 304A and 304B are components of a single physical fabric interconnecting hosts 300 with storage devices 308. When the term "fabric" or "SAN fabric" is used herein, it is in reference to a physical fabric as opposed to a logical or virtual fabric. Using embodiments, one or more virtual fabrics may be created within or "on top of" a physical fabric potentially including heterogeneous switches. A virtual fabric may include a portion or all of the switch ports of one or more of the potentially heterogeneous switches of the physical fabric. Continuing with this example, virtual fabric 310A includes switch 304B and ports 306A of switch 304A. Virtual fabric 310A interconnects host 300A and ports 302D of host 300B to ports 310A of storage device 308A and storage device 308B and form a first virtual SAN. Virtual fabric 310B includes ports 306B of switch 304A, which interconnect ports 302C of host 300B to ports 308B of storage device 308A and form a second virtual SAN.

Switches 304A and 304B may be heterogeneous switches. In one embodiment, switches 304A and 304B may be connected by an inter-switch link (ISL). In one embodiment, virtual fabric 310A and 310B may each be configured with its own name service, management service, fabric configuration service, zoning service, and/or other fabric services as necessary or desired. Note that FIG. 1 is exemplary and virtual fabrics 310 as described herein may be implemented in SANs including various combinations of one or more fabrics each including one or more switches 304 and potentially other SAN fabric components such as bridges and hubs, one or more hosts 300, and one or more storage devices 308.

Figure 2A:
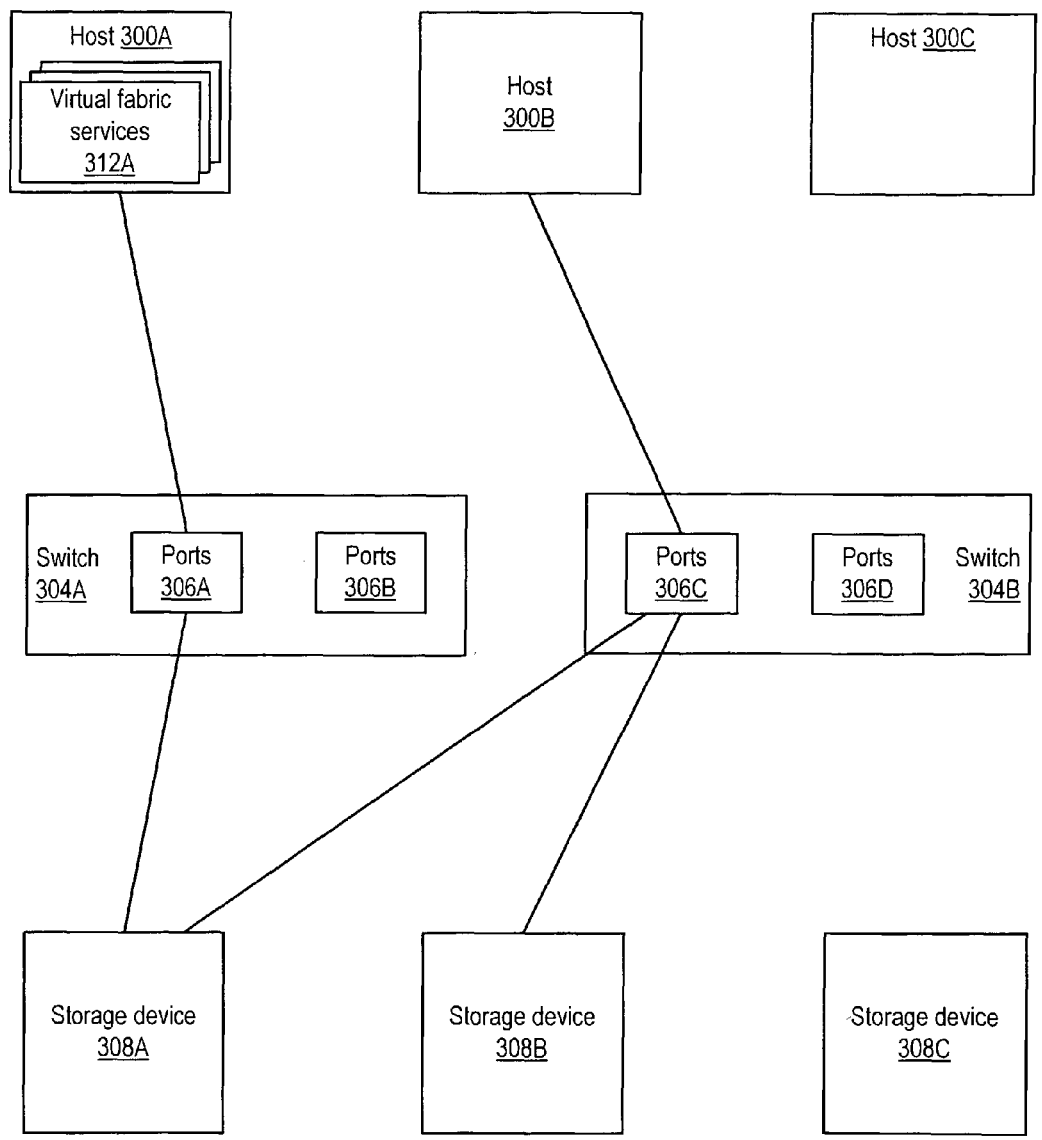
FIGS. 2A and 2B illustrate creating virtual fabrics in a SAN fabric according to one embodiment.
Figure 2B:
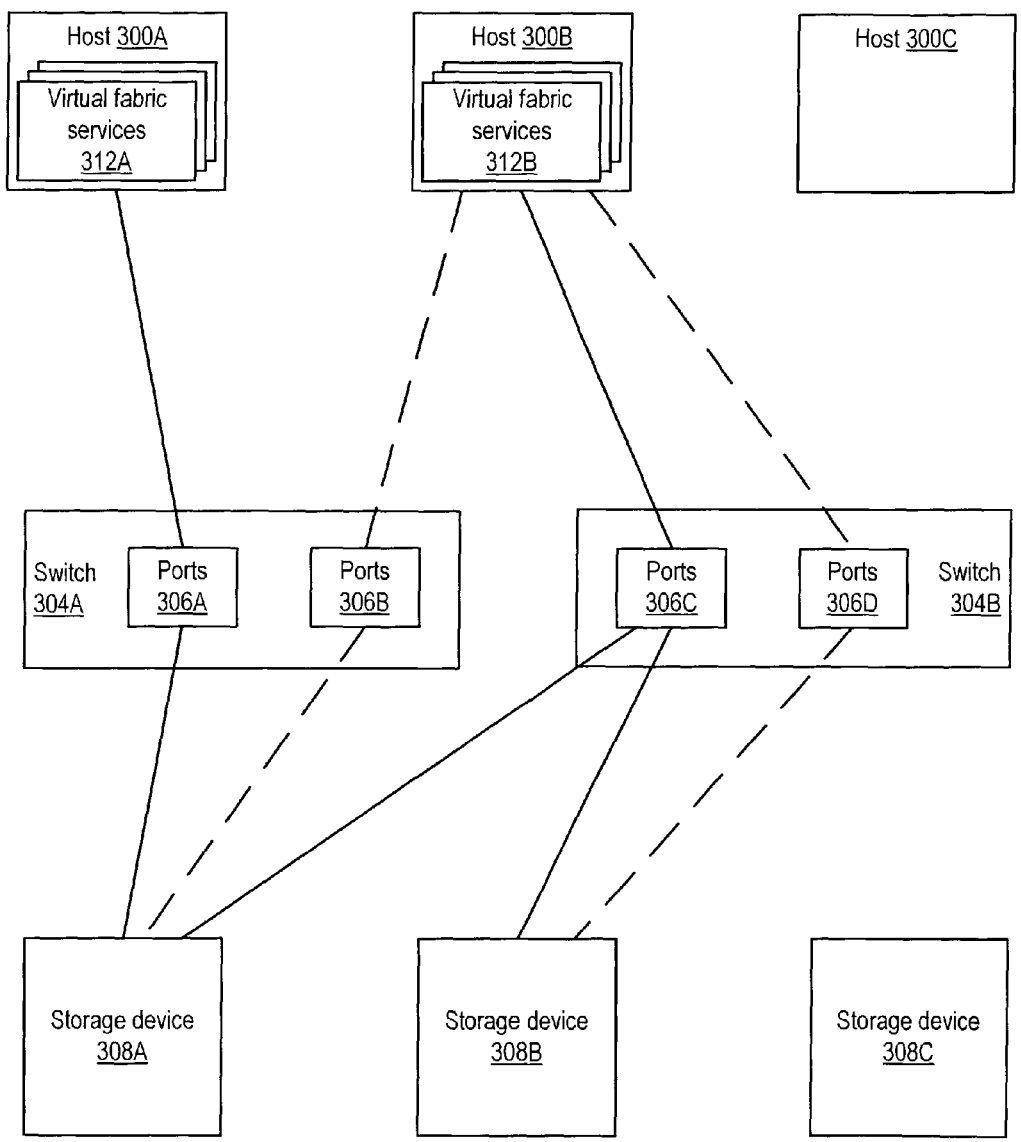

FIGS. 2A and 2B illustrate creating virtual fabrics in a SAN fabric according to one embodiment. FIG. 2A illustrates creating a first virtual fabric in the SAN fabric according to one embodiment. Hosts 300A, 300B and 300C may be coupled to storage devices 308A, 308B and 308C via a physical fabric comprising potentially heterogeneous switches 304A and 304B (and potentially other fabric components including other switches, bridges, hubs, etc.) The hosts 300A-C, storage devices 308A-C, and the fabric may be collectively referred to as a SAN. A first virtual fabric may be created, and ports 306A of switch 304A and ports 306C of switch 304B may be added to the first virtual fabric. Ports 306A may connect one or more HBA ports of host 300A to one or more ports of storage device 308A. Ports 306C may connect one or more HBA ports of host 300B to one or more ports of storage device 308A and one or more ports of storage device 308B. One or more virtual fabric services 312A may be provided for the first virtual fabric, in this example by host 300A. The HBA ports and storage device ports, together with the virtual fabric including switch ports 306A and 306C, may collectively be referred to as a virtual SAN within the SAN.

FIG. 2B illustrates creating a second virtual fabric in the SAN fabric according to one embodiment. A second virtual fabric may be created, and ports 306B of switch 304A and ports 306D of switch 304B may be added to the first virtual fabric. Ports 306B may connect one or more HBA ports of host 300B to one or more ports of storage device 308A. Ports 306D may connect one or more HBA ports of host 300B to one or more ports of storage device 308B. One or more virtual fabric services 312B may be provided for the second virtual fabric, in this example by host 300B. Thus, each virtual fabric is provided with its own set of virtual fabric services. The HBA ports and storage device ports, together with the virtual fabric including switch ports 306B and 306D, may collectively be referred to as a virtual SAN within the SAN.

While FIGS. 2A and 2B describe adding switch ports to the virtual fabrics, note that in one embodiment, switches and switch slots (groups of two or more switch ports) may be added to a virtual fabric and, in so doing, all switch ports of the switch or switch slot may be added to the virtual fabric. In one embodiment, SAN components other than switches (e.g. hosts 300, HBAs, HBA ports, storage devices 308, storage device ports, etc.) may be added to a virtual fabric and, in so doing, switch ports connected to the components may be automatically added to the virtual fabric.

Note that in FIG. 2B, host 300C and storage device 308C are not included in the first or second virtual fabric. A user may configure additional virtual fabrics on the physical SAN fabric that may interconnect ports on host 300C to one or more storage devices and/or ports on storage device 308C to one or more hosts to form additional virtual SANs on the SAN, if desired. In one embodiment, a user may also add switch ports on switches 306A and/or switch port 306B or on other switches on the physical fabric that interconnect ports on one or more of the hosts to ports on one or more of the storage devices to one or both of the virtual fabrics shown in FIG. 2B, if desired.

Figure 3:
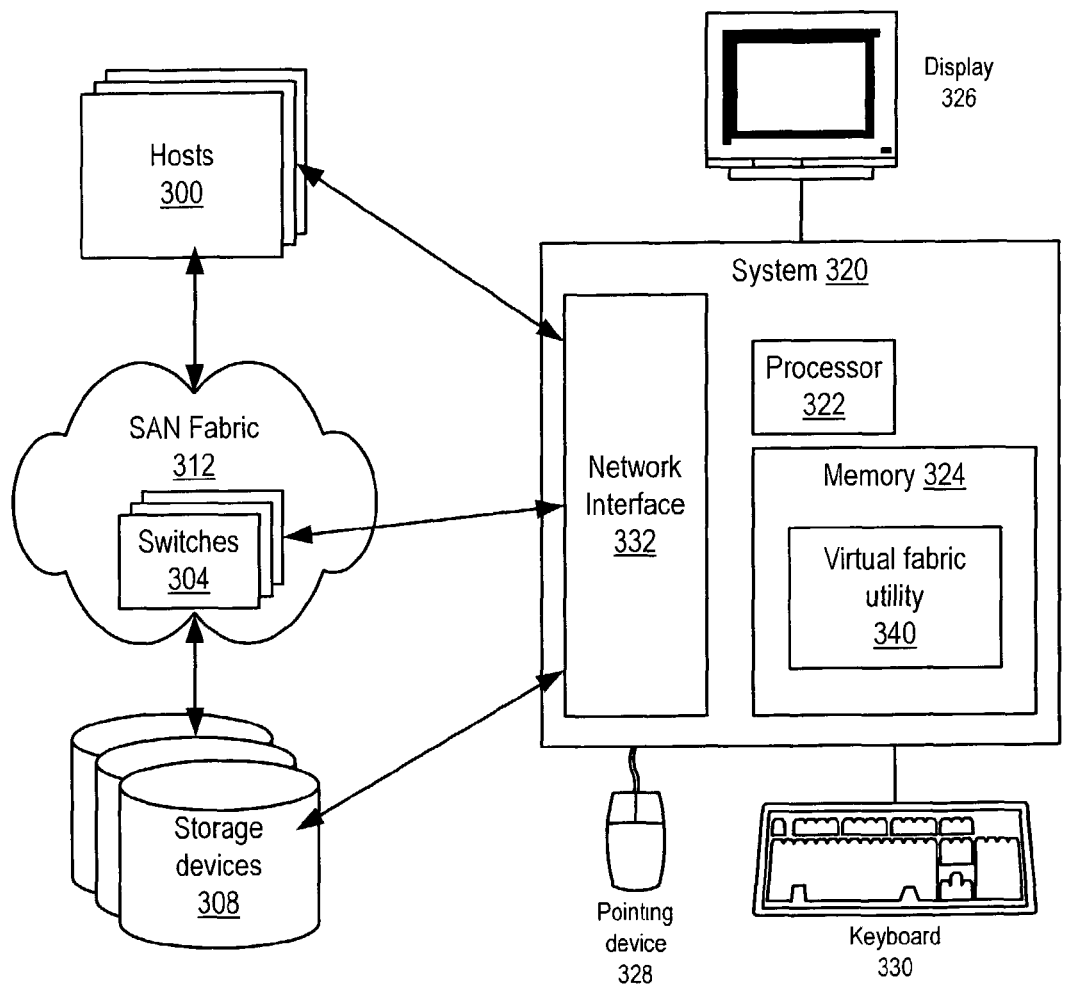
FIG. 3 illustrates an exemplary SAN coupled to a system including a virtual fabric utility according to one embodiment.

Embodiments may provide a virtual fabric utility for configuring virtual fabrics that may include heterogeneous switches. FIG. 3 illustrates an exemplary SAN coupled to a system including a virtual fabric utility according to one embodiment. System 320 may be any of the various types of devices, including, but not limited to, a personal computer system, desktop computer, laptop or notebook computer, mainframe computer system, workstation, network appliance, network computer, Internet appliance, or other suitable device. System 320 may include at least one processor 322. The processor 322 may be coupled to a memory 324. Memory 324 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 320 may also be coupled to one or more computer displays 326, one or more cursor control or pointing devices 328 such as a computer mouse, and a keyboard 330.

System 320 may couple to one or more of the SAN switches 304, hosts 300, and storage devices 308 via network interface 332. Network interface 332 may include one or more network connections to one or more different types of communications networks.

System 320 may couple to the SAN via one or more out-of-band network connections (e.g. Ethernet, LAN, WAN or other network connections). System 320 may also couple to the SAN via one or more in-band network connections. In-band refers to transmission of a protocol other than the primary data protocol over the same medium (e.g. Fibre Channel) as the primary data protocol of the SAN. Out-of-band refers to transmission of information among SAN components outside of the Fibre Channel network, typically over Ethernet, on a LAN, WAN, or other network.

System 320 may include, in memory 324, a virtual fabric utility 340. In one embodiment, the user may be able to create, view, and/or manage aspects of one or more virtual fabrics on top of SAN fabric 312 through keyboard 330 and pointing device 328 entries to the virtual fabric utility 340. The virtual fabric utility 340 may be generic to support the configuration and management of virtual fabrics created for various reasons and including heterogeneous components. The virtual fabric utility 340 may allow virtual fabrics to be configured on a generic, multiswitch basis, where multiple, potentially heterogeneous switches 304 that support virtual fabrics may be connected together and configured to support one or more virtual fabrics. Using the virtual fabric utility 340, users may not be required to directly specify ports on individual switches 304 to be included in a virtual fabric. The virtual fabric utility may provide a graphical user interface (GUI) that may be configured to display SAN components (e.g. hosts 300, HBAs, HBA ports, storage devices 308, storage-device ports, hubs, bridges, etc.) connected to the switch ports in the SAN and may provide the capability for the user to select and add one or more of the displayed SAN components to a virtual SAN including virtual fabric. In one embodiment, adding one of these SAN components to a virtual SAN may automatically include switch ports attached to the SAN component to the virtual fabric. For example, the virtual fabric utility 340 may allow a user to select SAN components including a Unix host, a Windows host and an EMC array to be included in a virtual SAN during configuration. One or more switch ports on one or more potentially heterogeneous switches 304 in the SAN fabric 312 physically connected to the selected SAN components may be automatically included in the virtual fabric of the virtual SAN. Thus, a virtual fabric may be specified at the SAN component level rather than at a switch port-specific level.

System 320 may be a host system 300 of the SAN, or alternatively may be a non-host (e.g. end-user) system coupled to the SAN via a LAN or WAN connection to one or more of the hosts 300. In one embodiment, two or more systems 320 may be included in a SAN each including an instance of the virtual fabric utility 340. One embodiment of a mechanism for configuring and managing virtual fabrics may be implemented in a SAN management system such as the exemplary SAN management system described below. In one embodiment, a virtual fabric utility 340 may be implemented in a SAN management console such as the SAN manager of the exemplary SAN management system described below. In one embodiment, the SAN management system may discover information for SAN components including, but not limited to, hosts 300, storage devices 308, and fabric devices (e.g. switches 304) which may be used by the virtual fabric utility 340 to display the SAN components to the user and to configure virtual fabrics as specified by the user through the virtual fabric utility GUI. In one embodiment, the virtual fabric utility 340 may be configured to display and manage previously configured virtual fabrics. Displaying a virtual fabric may include graphically and/or textually displaying SAN components (hosts 300, storage devices 308, switches 304, switch slots (groups of two or more switch ports), individual switch ports, etc.) and, in one embodiment, optionally displaying detailed information about the SAN components in the virtual fabric. Managing a virtual fabric may include, but is not limited to, deleting a virtual fabric, modifying an existing virtual fabric by deleting and/or adding SAN components (including one or more of, but not limited to, switches, switch slots, switch ports, hosts, and storage devices) to the virtual fabric, and setting the state of a virtual fabric or components of a virtual fabric to an active or inactive state.

The virtual fabric utility may be used to create new virtual fabrics and to manage existing virtual fabrics. In one embodiment, the virtual fabric utility may include a display page that may be used to create a new virtual fabric or to select a current virtual fabric for modification. In one embodiment, the virtual fabric utility may include a display page for modifying the membership (adding and/or deleting virtual fabric components) of a selected existing virtual fabric and/or a newly created virtual fabric. In one embodiment, the virtual fabric utility may include a display page that summarizes selected components to be added and/or deleted for confirmation. In some embodiments, the functions of the above display pages may be combined into one or two display pages. Some embodiments may include other display pages in addition to the display pages described above.

Figure 4A:
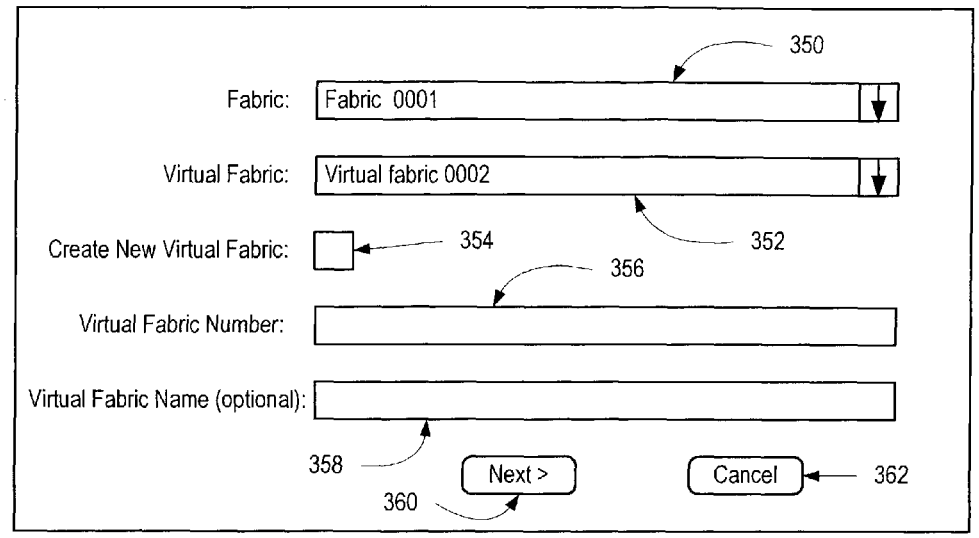
FIG. 4A illustrates an exemplary display page of the virtual fabric utility for creating a new virtual fabric and/or for selecting a current virtual fabric for modification according to one embodiment.

FIG. 4A illustrates an exemplary display page of the virtual fabric utility for creating a new virtual fabric and/or for selecting a current virtual fabric for modification according to one embodiment. This display page may allow the user to specify or select a fabric, and to select or create a virtual fabric within the specified fabric. Using this page, the virtual fabric number, and optionally name, of a new virtual fabric in the selected fabric may be set, or alternatively an existing virtual fabric in the selected fabric may be selected. A fabric may be selected or specified with user interface item 350. In one embodiment, this user interface item 350 may be implemented as a popup menu which lists available fabrics and from which the user may select a fabric. In one embodiment, at startup, the virtual fabric utility may provide a mechanism to optionally modify an existing virtual fabric or create a new virtual fabric. For example, the utility may display a user interface item 354, such as a checkbox, that is selectable to create a new virtual fabric. If this user interface item 354 is not selected, the user may specify an existing virtual fabric in user interface item 352 to modify. In one embodiment, this user interface item 352 may be implemented as a popup menu which lists existing virtual fabrics and from which the user may select a virtual fabric. In one embodiment, selecting to create a new virtual fabric may enable other user interface items, such as fields to enter a virtual fabric number 356 and a name 358 for the new virtual fabric. In one embodiment, the name may be optional.

In one embodiment, this display page may include a "Cancel" button 362 or its functional equivalent to allow the user to cancel the operation of the virtual fabric utility without applying the changes (e.g. creating a new virtual fabric), if desired. In one embodiment, this display page may include a user interface item such as a "Next" button 360 or its functional equivalent. Selecting this user interface item may display the display page of FIG. 4B.

Figure 4B:
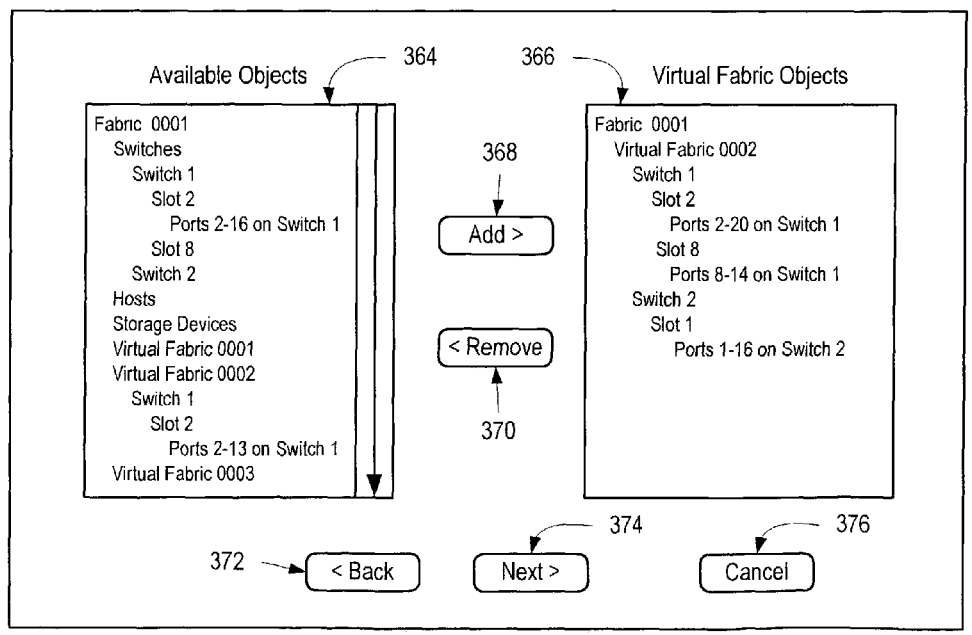
FIG. 4B illustrates an exemplary display page of the virtual fabric utility for modifying the membership of a selected existing virtual fabric or a newly created virtual fabric according to one embodiment.

FIG. 4B illustrates an exemplary display page of the virtual fabric utility for modifying the membership (adding and/or deleting virtual fabric objects) of a selected existing virtual fabric or a newly created virtual fabric according to one embodiment. After a user selects to either create a new virtual fabric or edit an existing virtual fabric, the virtual fabric utility may display this page for modifying the membership of a selected existing virtual fabric or a newly created virtual fabric. This display page may display the switches, switch slots, and switch ports that are available to be added to the virtual fabric and, in one embodiment, may also display SAN components (e.g. hosts, Host Bus Adapters (HBAs), HBA ports, storage devices and storage device ports) that the switch ports are connected to in the SAN. One embodiment may also display trunking ports, if any. Trunking ports are switch ports that may be members of multiple virtual fabrics. This display page may also display the currently selected virtual fabric, the virtual fabric's member switch ports, and the SAN components that the switch ports are connected to. In this example, the available switch ports and their connected SAN components, if any, are displayed in a tree structure in one pane 364 (which may be referred to as an available objects pane), while the member switch ports of the selected virtual fabric and their connected components are displayed in a tree structure in another pane 366 (which may be referred to as a member objects pane). Other embodiments may use other methods to to display available and member virtual fabric objects.

The available objects pane 364 may display all of the available objects (switch ports and SAN components) in the fabric selected on the exemplary display page illustrated in FIG. 4A. The user may select objects in the available objects pane 364 and add them to the member objects pane 366. Embodiments of the virtual fabric utility may provide one or more mechanisms for adding selected objects in the available objects pane 364 to the member objects of the selected virtual fabric in the member objects pane 366. In one embodiment, after selecting one or more objects in the available objects pane 364, the user may select a user interface item 368 (e.g. an "Assign" or "Add" button) to add the selected available objects to the member objects of the selected virtual fabric in the member objects pane 366. In one embodiment, objects may be drag-and-dropped from the available objects pane 364 into the member objects pane 366 using a pointing device such as a mouse. One skilled in the art will recognize that other user interface mechanisms may be used to add available objects to the selected virtual fabric.

In one embodiment, individual switch ports may be displayed in and selected from the available objects pane 364 to be added to the selected virtual fabric's member objects. In one embodiment, slots of a switch may be displayed in and selected from the available objects pane 364 to be added to the selected virtual fabric's member objects. A slot includes two or more of a switch's ports. In selecting and adding a slot, all ports of the slot may be added to the virtual fabric. In one embodiment, switches may be displayed in and selected from the available objects pane 364 to be added to the selected virtual fabric's member objects. In selecting and adding a switch, all ports of the switch may be added to the virtual fabric. In one embodiment, the switches, switch slots and switch ports displayed in the available objects pane 364 for adding to the virtual fabric may include heterogeneous switches of various models from one or more switch vendors.

In one embodiment, SAN components other than switches, switch slots, and switch ports may be displayed in the available objects pane for adding to the member objects pane. In one embodiment, these components may include one or more potentially heterogeneous hosts, Host Bus Adapters (HBAs) and/or HBA ports. In one embodiment, these components may include one or more potentially heterogeneous storage devices (e.g. disk arrays) and/or storage device ports (e.g. array ports). Other embodiments may include other types of components in the available objects pane 364, for example fabric components including hubs and bridges. These components may be selected from the available objects pane 364 and added to the member objects pane 366, and thus to the virtual fabric, similarly to switches, switch ports and switch slots. In one embodiment, adding one of these components to the member objects pane 366 may add all switch ports connected to the component (and not already member objects of the virtual fabric) to the virtual fabric.

In one embodiment, the user may select objects in the member objects pane 366 to be removed from the selected virtual fabric and added to the available objects pane 364. Embodiments of the virtual fabric utility may provide one or more mechanisms for removing selected objects from the member objects of the selected virtual fabric. In one embodiment, after selecting one or more objects in the member objects pane 366, the user may select a user interface item 370 (e.g. a "Remove" button) to remove the selected objects from the member objects of the selected virtual fabric and add them to the available objects. In one embodiment, objects may be drag-and-dropped from the member objects pane 366 into the available objects pane 364 using a pointing device such as a mouse. One skilled in the art will recognize that other user interface mechanisms may be used to remove member objects from the selected virtual fabric. In one embodiment, individual switch ports may be displayed in and selected from the member objects pane 366 to be removed from the selected virtual fabric's member objects. In one embodiment, slots of a switch may be displayed in and selected from the member objects pane 366 to be removed from the selected virtual fabric's member objects. In selecting and removing a slot, all ports of the slot may be removed from the virtual fabric. In one embodiment, switches may be displayed in and selected from the member objects pane 366 to be removed from the selected virtual fabric's member objects. In selecting and removing a switch, all ports of the switch may be removed from the virtual fabric. In selecting and removing a switch slot, all switch ports of the switch slot may be removed from the virtual fabric. In one embodiment, components other than switches may be selected and removed from the member objects pane 366. In selecting and removing a component, all switch ports connected to the component may be removed from the virtual fabric.

In one embodiment, this display page may include a "Back" button 372 or its functional equivalent to allow the user to return to the display page of FIG. 4A to select a different fabric and/or virtual fabric or to create a new virtual fabric, if desired. In one embodiment, this display page may include a "Cancel" button 376 or its functional equivalent to allow the user to cancel the operation of the virtual fabric utility without applying the changes, if desired. In one embodiment, this display page may include a "Next" button 374 or its functional equivalent. Selecting the "Next" button 374 may display the display page of FIG. 4C.

Figure 4C:
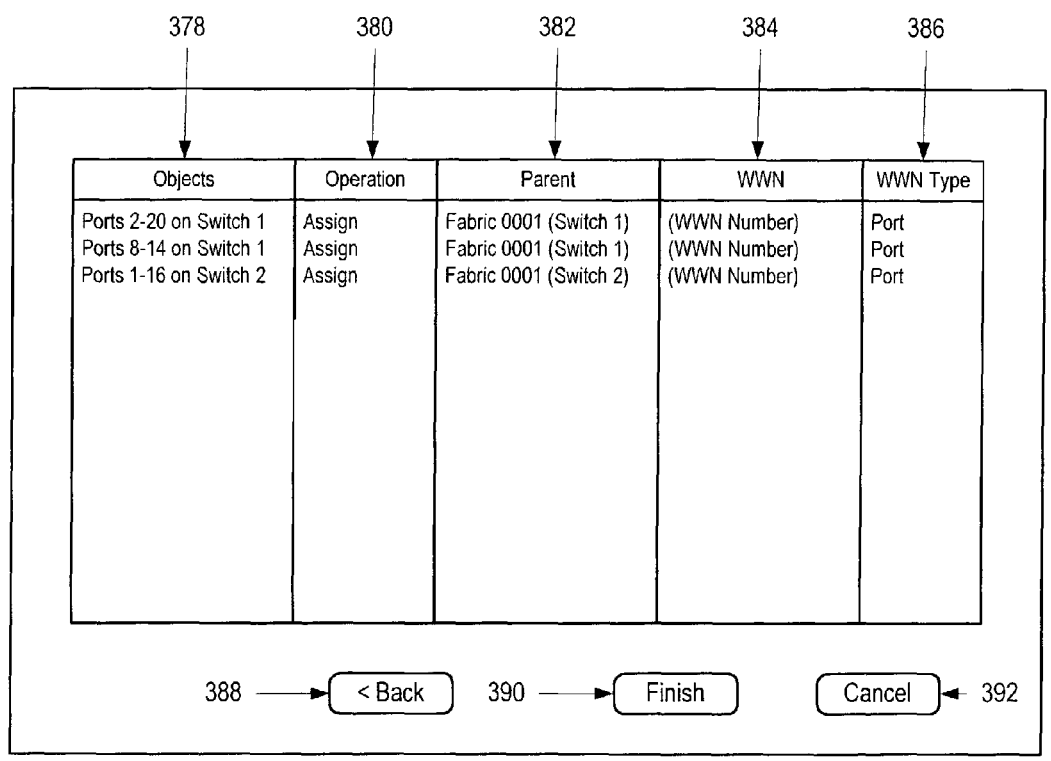
FIG. 4C illustrates an exemplary display page of the virtual fabric utility that summarizes selected components to be added and/or deleted for confirmation according to one embodiment.

FIG. 4C illustrates an exemplary display page of the virtual fabric utility that summarizes selected components to be added and/or deleted for confirmation according to one embodiment. In one embodiment, this display page lists the changes made to the virtual fabric (additions and/or deletions) for the user to review and, if satisfactory, apply to the virtual fabric. In one embodiment, for each object, this display page may show one or more of, but is not limited to, the object 378, the operation 380 to be performed on the object(s) (e.g. assign (add) or remove the object(s)), the object's parent 382, the object's World Wide Name (WWN) 384, and the WWN type 386 (e.g. port). In one embodiment, this display page may include a user interface item 390 (e.g. a "Finish" or "Apply" button or functional equivalent) that is user-selectable to apply the changes to the virtual fabric. In one embodiment, this display page may include a user interface item 388 such as a "Back" button or its functional equivalent to allow the user to go back to the display page of FIG. 4B to modify the changes to the virtual fabric, if desired. In one embodiment, one or more operations that need to be performed to apply the changes (e.g. by the SAN access layer of the exemplary SAN management system described below) upon clicking the user interface item to apply the changes may also be displayed on this display page. In one embodiment, this display page may also include a "Cancel" button 392 or its functional equivalent to allow the user to cancel the operation of the virtual fabric utility without applying the changes, if desired.

In one embodiment, upon selecting the user interface item 390 to apply the changes to the virtual fabric, the virtual fabric utility may send one or more requests to perform the virtual fabric operations as specified by the interactions of the user with the virtual fabric utility to a SAN management system (e.g. the exemplary SAN management system described below) in which the virtual fabric utility is implemented to perform the changes. In one embodiment, these requests may be messages formatted according to a markup language. In one embodiment, the markup language may be eXtensible Markup Language (XML). In one embodiment, each operation performed by the SAN management system in response to the request(s) may be done on a switch-by-switch basis for each physical switch included in the virtual fabric The following are several examples of such requests formatted according to XML, and are included for exemplary purposes and are not intended to be limiting.

The following is an exemplary request to create a new virtual fabric:
```
<Request>
    <MsgType>SwitchCreateVirtualSwitch</MsgType>
    <Version major="1" minor="0" release="release" />
    <AttributeEncoding>attributes </AttributeEncoding>
    <SwitchReference>VEGASSwitchOID_X</SwitchReference>
    <MUXChannel>M</MUXChannel>
    <PortReference>VegasPortOID_A</PortReference>
    <PortReference>VegasPortOID_B</PortReference>
</Request>
```

The following is an exemplary request to add a switch port to a virtual fabric:
```
<Request>
    <MsgType>SwitchAddPort</MsgType>
    <Version major="1" minor="0" release="release" />
    <AttributeEncoding>attributes </AttributeEncoding>
    <SwitchReference>VEGASSwitchOID_X</SwitchReference>
    <MUXChannel>M</MUXChannel>
    <PortReference>VegasPortOID_A</PortReference>
    <PortReference>VegasPortOID_B</PortReference>
</Request>
```

The following is an exemplary request to remove a switch port from a virtual fabric:
```
<Request>
    <MsgType>SwitchRemovePort</MsgType>
    <Version major="1" minor="0" release="release" />
    <AttributeEncoding>attributes </AttributeEncoding>
    <SwitchReference>VEGASSwitchOID_X</SwitchReference>
    <MUXChannel>M</MUXChannel>
    <PortReference>VegasPortOID_A</PortReference>
    <PortReference>VegasPortOID_B</PortReference>
</Request>
```

The following is an exemplary request to delete a virtual fabric. In one embodiment, deleting a virtual fabric may be performed on a switch-by-switch basis:
```
<Request>
    <MsgType>SwitchDestroy</MsgType>
    <Version major="1" minor="0" release="release" />
    <AttributeEncoding>attributes </AttributeEncoding>
    <SwitchReference>VirtualSwitch_OID_H</SwitchReference>
</Request>
```

The following describes an exemplary mechanism for creating a virtual fabric according to one embodiment. For a selected physical fabric, get all of the virtual switches. For each enabled switch, get the virtual fabric-capable ports (e.g. trunk ports and ports not currently in a virtual fabric). As the user selects and adds ports to the virtual fabric (e.g. using an embodiment of the virtual fabric utility), if ports from different physical switches are added, and if there has not been an Inter-Switch Link (ISL) port added to this virtual fabric yet, return an error or, alternatively a warning.

The following describes an exemplary mechanism for modifying a virtual fabric according to one embodiment. For a selected physical fabric, get all of the virtual switches. For each virtual switch, store the virtual switch based on its MUX channel number, for example in a hash table or other format. For each MUX channel number, get the corresponding list of virtual switches. If any of these virtual switches are connected via an E or TE port, create a temporary object combining all of the port children. [INVENTORS: could you define E and TE ports and "port children"?] Set the name of the [INVENTORS: name of what?], for example to Vswitch MUXChannel or V-Fabric MUXChannel on the primary switch. [INVENTORS: what is the "primary switch"?], The following describes an exemplary mechanism for confirming a newly created or modified existing virtual fabric according to one embodiment. Examine each of the ports selected (e.g. using an embodiment of the virtual fabric utility) and get the physical parent switch. For each physical switch, if creating a new virtual fabric, send one or more requests (e.g. XML messages) to the SAN management system indicating the physical switch ports, virtual switch number, virtual switch name, etc. of the virtual switch to be created. If modifying an existing virtual fabric, send one or more requests (e.g. XML messages) to the SAN management system indicating the switch ports to be added or removed from the selected virtual switch.

[INVENTORS: the above three paragraphs are my interpretation of proposed pseudocode examples from Appendix A of the Proposal document that was provided to us. These seem a little "thin" so any more information you could provide would be appreciated. Or, we could possibly just delete these three paragraphs if you don't think they are correct or necessary]

Figure 5:
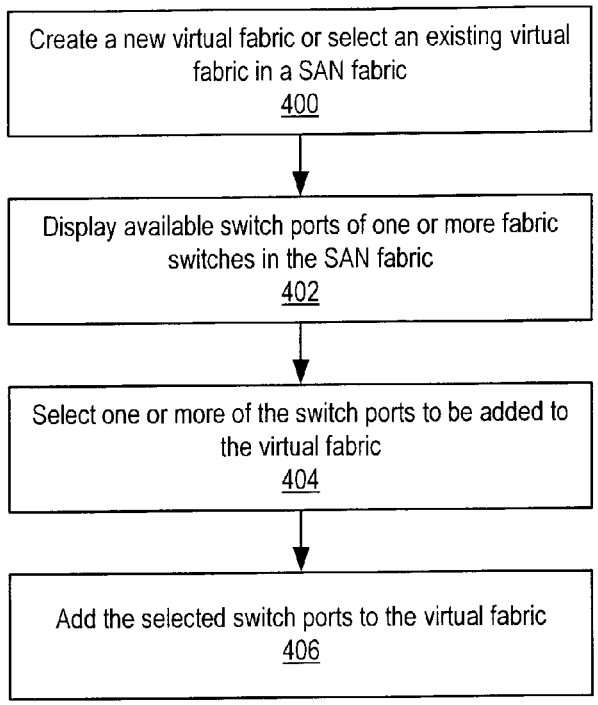
FIG. 5 is a flowchart illustrating a method of adding switch ports from potentially heterogeneous switches to a virtual fabric using a virtual fabric utility according to one embodiment.

FIG. 5 is a flowchart illustrating a method of adding switch ports from potentially heterogeneous switches to a virtual fabric using a virtual fabric utility according to one embodiment. As indicated at 400, a user may first create a new virtual fabric or select an existing virtual fabric in a SAN fabric. In one embodiment, the user may first specify a physical fabric of a SAN within which a virtual fabric is to be created or selected. After creating or selecting a virtual fabric, available switch ports of one or more potentially heterogeneous fabric switches may be displayed for selection as indicated at 402. In one embodiment, switches and switch slots, each including a plurality of switch ports, may also be displayed. In one embodiment, other SAN components coupled to the switch ports including one or more of, but not limited to, hosts, HBAs, HBA ports, storage devices and storage device ports may also be displayed. The user may then select one or more of the displayed switch ports, switch slots, and/or switches for addition the virtual fabric as indicated at 404. In one embodiment, the selected switch ports, slots and/or switches may be displayed for verification by the user. After verifying the selections, the selected switch ports, slots and/or switches may be added to the virtual fabric as indicated at 406. In one embodiment, a user may also select and remove switch ports, slots and/or switches from the virtual fabric.

Figure 6:
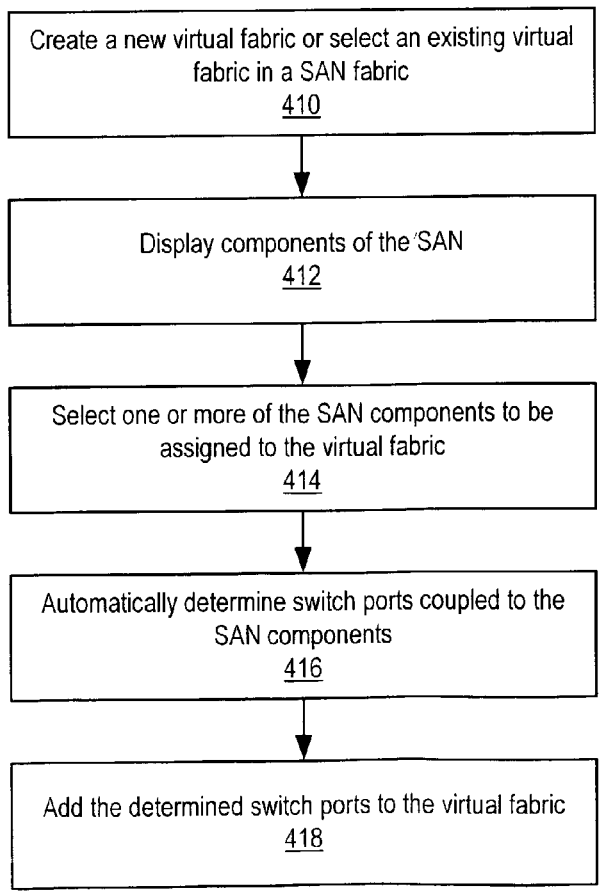
FIG. 6 is a flowchart illustrating a method of selecting SAN components and adding switch ports coupled to the SAN components to a virtual fabric using a virtual fabric utility according to one embodiment.

FIG. 6 is a flowchart illustrating a method of selecting SAN components and adding switch ports coupled to the SAN components to a virtual fabric using a virtual fabric utility according to one embodiment. As indicated at 410, a user may first create a new virtual fabric or select an existing virtual fabric in a SAN fabric. In one embodiment, the user may first specify a physical fabric of a SAN within which a virtual fabric is to be created or selected. After creating or selecting a virtual fabric, components of the SAN including one or more of, but not limited to, hosts, HBAs, HBA ports, storage devices and storage device ports may be displayed for selection and assignment to the virtual fabric as indicated at 412. In one embodiment, available switch ports of one or more fabric switches may also be displayed for selection and assignment to the virtual fabric. In one embodiment, switches and switch slots, each including a plurality of switch ports, may also be displayed. The user may then select one or more of the SAN components for assignment to the virtual fabric as indicated at 414. The switch ports coupled to the selected one or more SAN components may then be automatically determined by the virtual fabric utility, as indicated at 416. In one embodiment, the selected SAN components and/or the determined switch ports may be displayed for verification by the user. After verifying the selections and/or the determined switch ports, the determined switch ports may be added to the virtual fabric as indicated at 418.

In one embodiment, a user may also select SAN components for removal from the virtual fabric. Switch ports coupled to the selected SAN components may be automatically determined and removed from the virtual fabric.

Note that, in one embodiment, the flowcharts of FIGS. 5 and 6 may be combined. In this embodiment, a combination of one or more of SAN components, switches, switch slots, and/or switch ports may be displayed for selection and assignment to a selected virtual SAN.

SAN Management System

Figure 7:
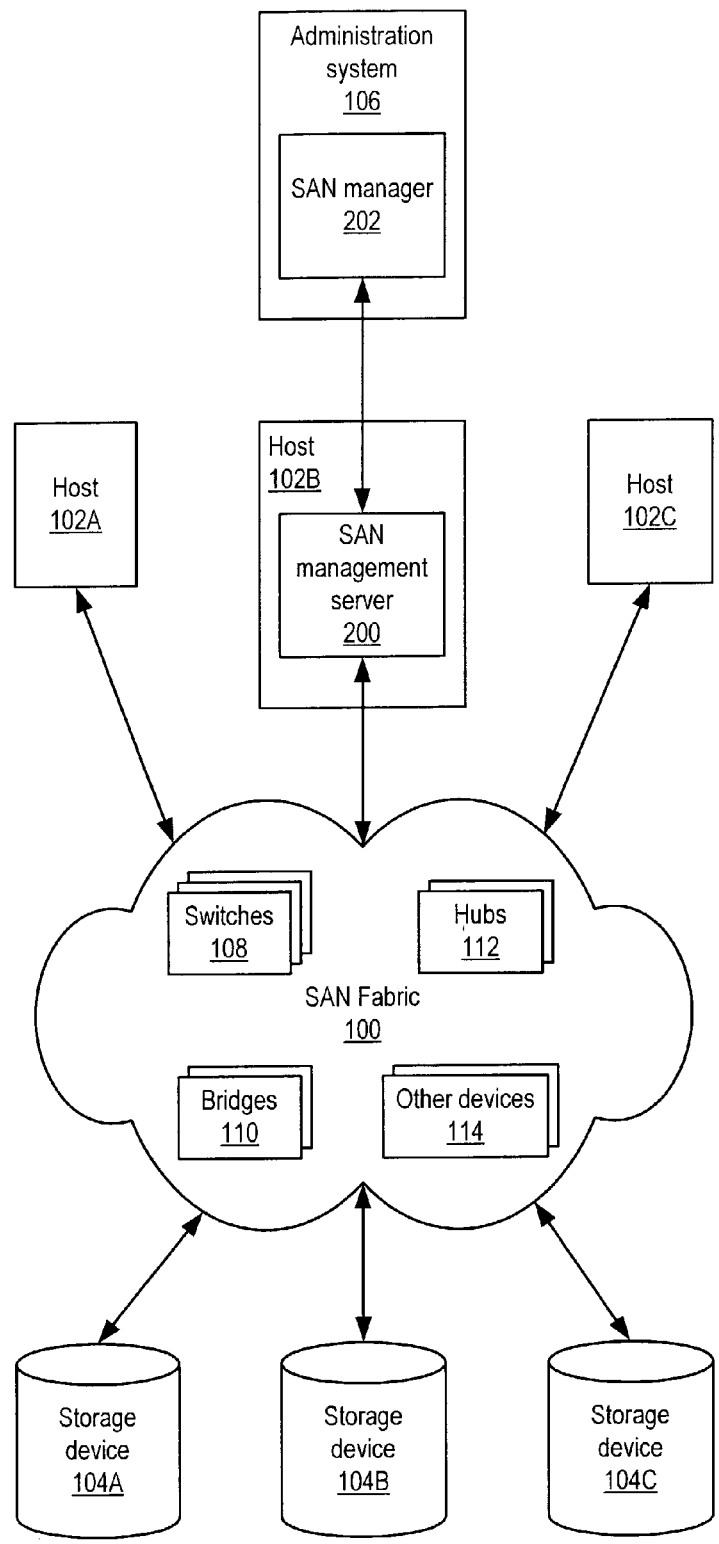
FIG. 7 shows an exemplary SAN implementing an embodiment of the SAN management system.

Embodiments of a centralized Storage Area Network (SAN) management system are described. FIG. 7 shows an exemplary SAN implementing an embodiment of the SAN management system. For one embodiment, SAN may be described as a high-speed, special-purpose network that interconnects storage devices 104 (e.g. storage devices 104A, 104B, and 104C) with associated data servers (e.g. hosts 102A, 102B, and 102C) on behalf of a larger network of users. A SAN may employ Fibre Channel technology. A SAN may include one or more hosts 102 (e.g. hosts 102A, 102B, and 102C), one or more storage devices 104 (e.g. hosts 102A, 102B, and 102C), and one or more SAN fabrics 100. A SAN may also include one or more administration systems 106. One or more end-user platforms (not shown) may access the SAN, typically via a LAN or WAN connection to one or more of the hosts 102.

Storage devices 104 may include, but are not limited to, RAID (Redundant Array of Independent Disks) systems, disk arrays, JBODs (Just a Bunch Of Disks, used to refer to disks that are not configured according to RAID), tape devices, and optical storage devices. Hosts 102 may run any of a variety of operating systems, including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host 102 is typically connected to the fabric 100 via one or more Host Bus Adapters (HBAs). SAN fabric 100 may enable server-to-storage device connectivity through Fibre Channel switching technology. SAN fabric 100 hardware may include one or more switches 108, bridges 110, hubs 112, or other devices 114 such as routers, as well as the interconnecting cables (for Fibre Channel SANs, fibre optic cables).

Embodiments may simplify and centralize the management of heterogeneous SANs to enable control of SAN resources including, but not limited to, logical volumes, fibre channel adapters, and switches 108, as well as storage devices 104. A logical volume is a virtual disk made up of logical disks. A logical disk (also referred to as a logical device) is a set of consecutively addressed FBA (Fixed Block Architecture) disk blocks that is part of a single virtual disk-to-physical disk mapping. Logical disks are normally not visible to the host environment, except during array configuration operations. A virtual disk is a set of disk blocks presented to an operating environment as a range of consecutively numbered logical blocks with disk-like storage and I/O semantics. The virtual disk is the disk array object that most closely resembles a physical disk from the operating environment's viewpoint.

Embodiments may provide centralized management of SAN-connected devices with automatic discovery, visualization, access control, and policy-based monitoring, alerting and reporting. Embodiments may provide a single point of management from logical unit to interconnect to SAN-connected hosts 102. A LUN (logical unit number) is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape drives and array controllers may incorporate multiple logical units to which I/O commands can be addressed. Each logical unit exported by an array controller may correspond to a virtual disk. An interconnect is a physical facility by which system elements are connected together and through which they can communicate with each other (e.g. I/O buses and networks.)

Embodiments may provide data-centric management from host applications through interconnects to the storage resources, regardless of the underlying hardware and operating system(s). SAN management may occur at physical and logical levels to maintain control regardless of the underlying device environment. With the discovery of host attributes like OS platform, OS handles and IP address, the critical link associating logical devices to a host 102 and its applications may be made.

One embodiment may include a SAN management server 200 and one or more SAN managers 202. SAN management server 200 may discover SAN objects and their attributes, and may provide event management, policy management, and/or notification services. SAN management server 200 may explore the SAN to make data available to client applications, including SAN manager 202. SAN management server 200 may run in a variety of operating systems including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). One embodiment may include an integrated volume manager that may provide capabilities including, but not limited to, pooling storage across multiple heterogeneous arrays on the SAN. The SAN management system may automatically discover and display volumes within its interface. Additionally, adding storage to a host may be streamlined though the SAN management system. In one embodiment, when zoning storage to a host, an operating system rescan may be automatically initiated so that the new device is immediately available for use by the volume manager on the host.

Embodiments may reduce or eliminate the manual task of tracking of devices and their connections in the SAN by automatically discovering the physical and logical connections of the SAN, displaying the information in a graphical topology map and logging the data in a variety of inventory reports. One embodiment may enable the automatic discovery of SAN resources using one or more in-band and/or out-of-band protocols and industry standards (e.g. MS/CT, GS-3, SNMP, Fibre Alliance MIB, ANSI T11, SCSI, CIM (Common Information Model), vendor-specific extensions, etc.). Using both in-band and out-of-band protocols, and leveraging industry standards, the SAN management system may automatically capture and display details, including, but not limited to, device driver version, firmware level, status, performance, free and in-use port count, hardware manufacturer, model number and worldwide name (WWN). In-band refers to transmission of a protocol other than the primary data protocol over the same medium (e.g. Fibre Channel) as the primary data protocol. Out-of-band refers to transmission of management information for Fibre Channel components outside of the Fibre Channel network, typically over Ethernet. In one embodiment, a storage administrator may assign customized attributes to devices in the SAN for use in tracking information such as physical location, account code, installation date and asset tag number.

SAN manager 202 may provide a central management interface for various SAN management tasks, and may provide a graphical user interface for displaying the information (e.g. XML data) compiled by and received from SAN management server 200 in graphical and/or textual format, and may provide a user interface for accessing various features of the SAN management system such as tools and utilities. SAN manager 202 may run on any of a variety of end-user platforms coupled to one or more of the hosts 102, typically via a LAN or WAN, or alternatively may run on one of the hosts 102, including the host 102 that includes SAN management server 200. One embodiment may provide in-context launch support for element managers supplied by device vendors to provide vendor-specific management. In one embodiment, to directly manage a device, the administrator may telnet to the device via the SAN manager.

Embodiments may provide customizable, intuitive views into a SAN based on host 102, device, fabric 100, or storage groups, as well as real-time alerts to diagnose and avoid outages. In one embodiment, SAN manager 202 may serve as a centralized point from which a user may view information about a SAN, including, but not limited to, information about the SAN's topology and heterogeneous components. In one embodiment, SAN manager 202 may provide a graphical user interface (GUI) to display information from the SAN access layer and other SAN management server components.

In one embodiment, SAN manager 202 may provide a GUI for facilitating management by allowing the user to graphically drill down into the logical and physical devices on the SAN. One embodiment may provide the ability to zoom in or out on areas of interest in a SAN topology map to simplify the navigation of a growing enterprise SAN. Within the topology map, integrated tool tips may be provided to help identify devices and paths in the SAN without having to navigate through a complex topology. Information on SAN devices, such as hosts 102 with Host Bus Adapters (HBAs), interconnects, and storage devices 104, may be displayed in context in the GUI, revealing resources in zones as they are physically and logically connected. One embodiment may include a search mechanism. For example, if the administrator wants to ensure that all interconnects in the SAN are at the same firmware level, the administrator may query an integrated search tool for firmware levels to automatically locate all the devices that match the search criteria for the specific firmware level.

One embodiment may provide a real-time alert viewer that may monitor heterogeneous device status, and may provide proactive management capabilities in the SAN environment. Through policies, the status and performance of the device(s) may be monitored, and alerts may be generated when behavior falls outside acceptable boundaries. Embodiments may enable intelligent monitoring through user-definable threshold levels and may perform actions automatically as well as notify administrators of critical events in real time.

Embodiments may provide both real-time and historical performance data for critical service-level parameters such as connectivity, available space and throughput. One embodiment may enable real-time performance charting of SAN devices. Embodiments may monitor interconnect and storage devices in real time, and may be used to display information about the various SAN devices such as current load/status. Through real-time performance monitoring, with flexible user-defined thresholds, one embodiment may notify administrators about issues that could affect overall SAN performance before the issues have an impact. Logging this data for reporting may, for example, extend the administrator's capability to audit and validate service-level agreements.

One embodiment may include a SAN reporter that enables the user to generate and view reports on details of the SAN. In one embodiment, the SAN manager may serve as a centralized point from which reports may be generated and viewed. Embodiments may provide both real-time and historical performance data for critical service-level parameters such as connectivity, available space and throughput. In one embodiment, the SAN management server may collect SAN data that may be provided as real-time and/or historical performance data to the SAN reporter for use in generating SAN performance reports. One embodiment may include "out-of-the-box" or predefined reports that allow users to inventory and analyze their SANs. Embodiments may provide detailed capacity reports to aid in growth planning and gathers detailed information for use in chargeback reports. One embodiment may track LUN allocation to hosts as well as to storage groups, distilling real-time and historical reports that show where storage resources are being consumed.

Figure 8:
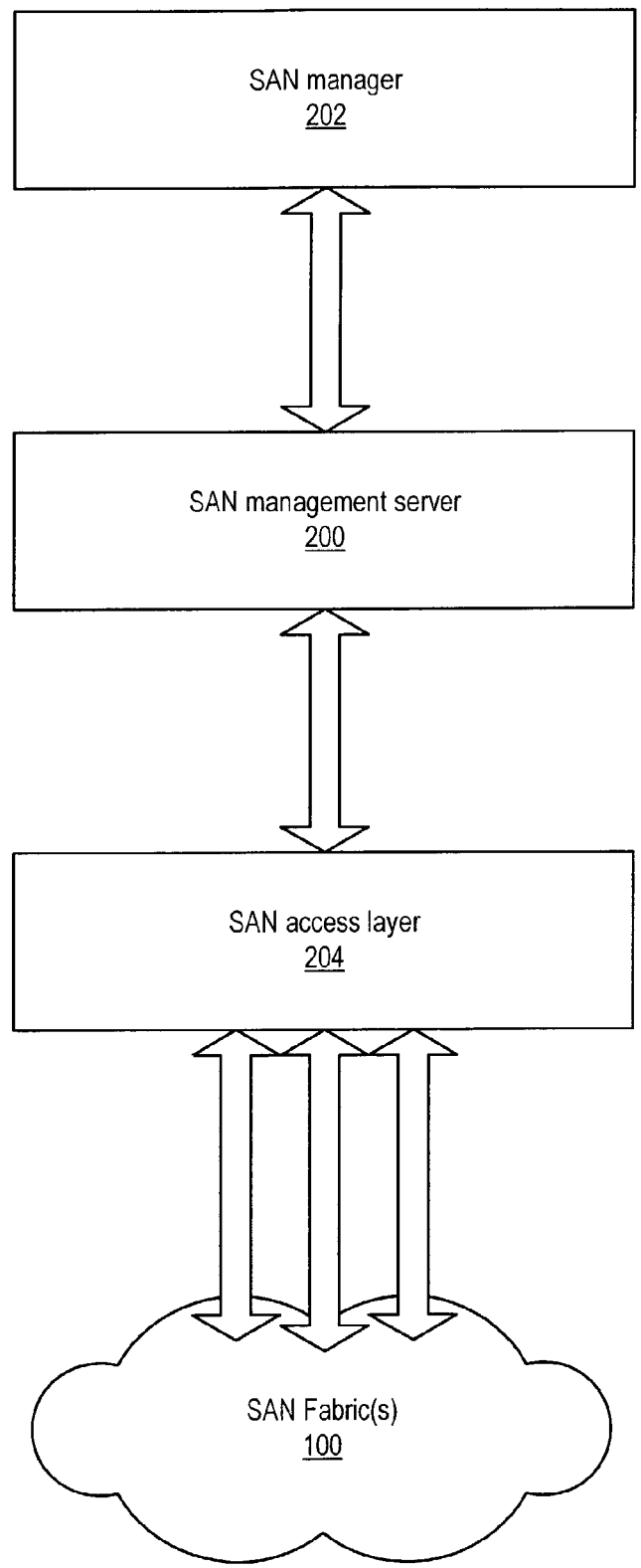
FIG. 8 illustrates the architecture of the SAN management system according to one embodiment.

FIG. 8 illustrates the architecture of the SAN management system according to one embodiment. This embodiment may be based on distributed client-server architecture, and may be divided into components that may include a SAN manager 202, a SAN management server 200, and a SAN access layer 204. The functions of SAN management server 200 may include one or more of, but are not limited to: automatically discovering SAN-attached objects including hosts, HBAs, switches and storage devices; maintaining a data store of real-time object information; managing SAN resources through zoning and LUN access control; monitoring conditions on the SAN; performing policy-based actions in response to SAN conditions; generating inventory and performance reports; and supporting user-defined grouping of objects based on quality of service (QoS) criteria.

By discovering objects and the relationship of these objects to each other, SAN access layer 204 may maintain a real-time topology of the SAN. SAN access layer 204 may also directly interface with switches on one or more fabrics to manage the zoning of storage resources. SAN access layer 204 may discover additional information about objects on the SAN that SAN management server 200 cannot discover directly, such as devices on a separate zone or fabric 100.

SAN manager 202 may be a central point for the user to perform one or more of SAN management tasks including, but not limited to, administering the SAN, viewing topographical displays of discovered objects on the SAN, accessing detailed information on components including object attributes and connectivity, creating and modifying policies, administering access control through zoning and LUN security, monitoring SAN events including real-time alerts, allocating storage resources, generating and viewing inventory and performance reports, generating and viewing real-time and historical reports, and/or launching utilities, tools and applications, which may include third-party management tools. In one embodiment, other applications, such as a Web browser, may function as clients to SAN management server 200. In one embodiment, multiple SAN managers 202 may connect simultaneously with SAN management server 200. One embodiment may include a command line interface that enables the user to query and modify SAN management server alarm service objects, configuration settings and perform other related SAN management system tasks.

Figure 9:
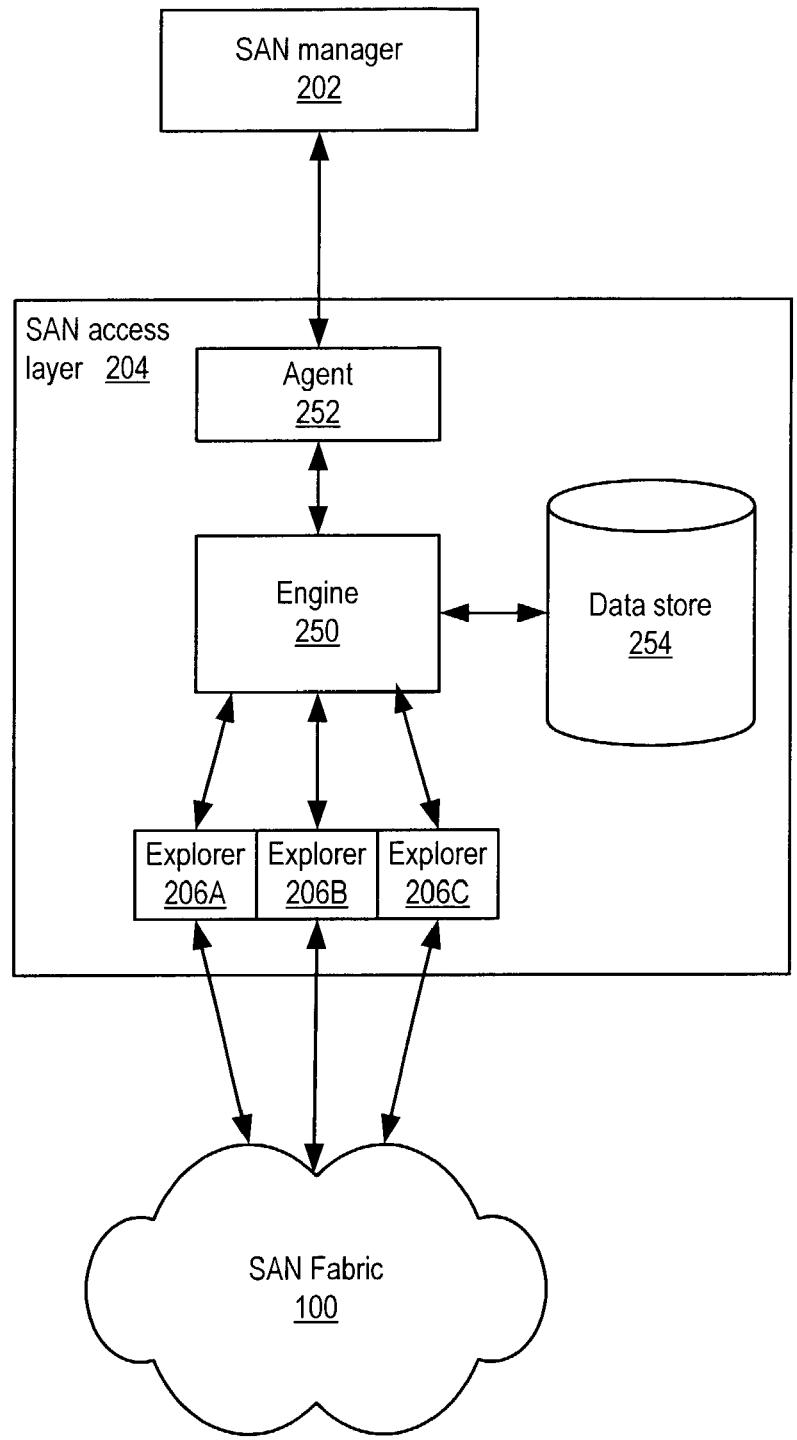
FIG. 9 illustrates the architecture of the SAN access layer according to one embodiment.

FIG. 9 illustrates the architecture of SAN access layer 204 according to one embodiment. In one embodiment, SAN access layer 204 may include an engine 250 that may perform one or more functions which may include, but are not limited to, coordinating the activity of explorers 206, managing changes to data store 254, and performing zoning operations by communicating with switches on fabric 100. In one embodiment, SAN access layer 204 may include one or more explorers that provide an interface to different types of heterogeneous SAN components so that the SAN management system may provide a common data representation for heterogeneous SAN components. Explorers 206 may communicate with the SAN components over Fibre Channel (in-band) and/or Ethernet (out-of-band) connections to inventory the SAN. Each explorer may communicate with a specific type of device using a protocol available for that specific type of device.

Once the SAN is discovered, SAN access layer 204 may continue to monitor the SAN and may update data store 254 as new events occur on the SAN. In one embodiment, SAN access layer 204 may periodically examine the SAN, for example to discover or determine objects that are added, objects that are removed, and connections that are pulled. In one embodiment, data gathered by the explorers may be aggregated into data store 254, which may be updated with real-time information about objects on the SAN. In one embodiment, SAN access layer engine 250 may manage data store 254. In one embodiment, data store 254 may be an embedded, ODBC-compliant, relational database. In one embodiment, data from the database may be imported into a data warehouse to track changes and analyze the SAN over periods.

In one embodiment, SAN access layer 204 may include an agent 252 that translates information from data store 254 into formatted files (e.g. XML files), which may be provided to client applications such as SAN manager 202 or Web browsers. Agent 252 may also enforce user authentication for commands sent to SAN management to server 200, and may handle communication between SAN management server 200 and any hosts running a SAN access layer remote (described below).

In one embodiment, SAN manager 202 is a client of SAN access layer 204, and may graphically and/or textually display objects discovered by SAN access layer 204. In one embodiment, SAN manager 202 may open a connection (e.g. TCP/IP socket) with SAN access layer agent 252 and send a message (e.g. an XML message) requesting data stored in data store 254. Upon receiving the request, SAN access layer engine 250 may dynamically create a document (e.g. an XML document) describing the SAN topology. SAN access layer agent 252 then may send this document to SAN manager 202. Once SAN manager 202 successfully receives the message, SAN access layer agent 252 may close the connection. When SAN manager 202 receives the document, it may read the file and display, in graphical and/or textual format, the information the document provides about the SAN.

In one embodiment, the data generated by SAN access layer 204 may be in a format (e.g. XML) that may be read by a Web browser or exported to a file that may be opened and edited using a standard text editor. In one embodiment, a SAN's current state may be captured in a file, e.g. an XML or other markup language file. Thus, snapshots of the SAN may be saved over time, which may be analyzed and compared to current conditions on the "live" SAN.

In one embodiment, SAN access layer 204 may be configured for discovery and device communication through a configuration file. The configuration file may include one or more parameters for the SAN access layer and/or globally for the explorers. Each type of explorer may have a section in the configuration file that may include one or more parameters specific to the particular type of explorer.

Figure 10:
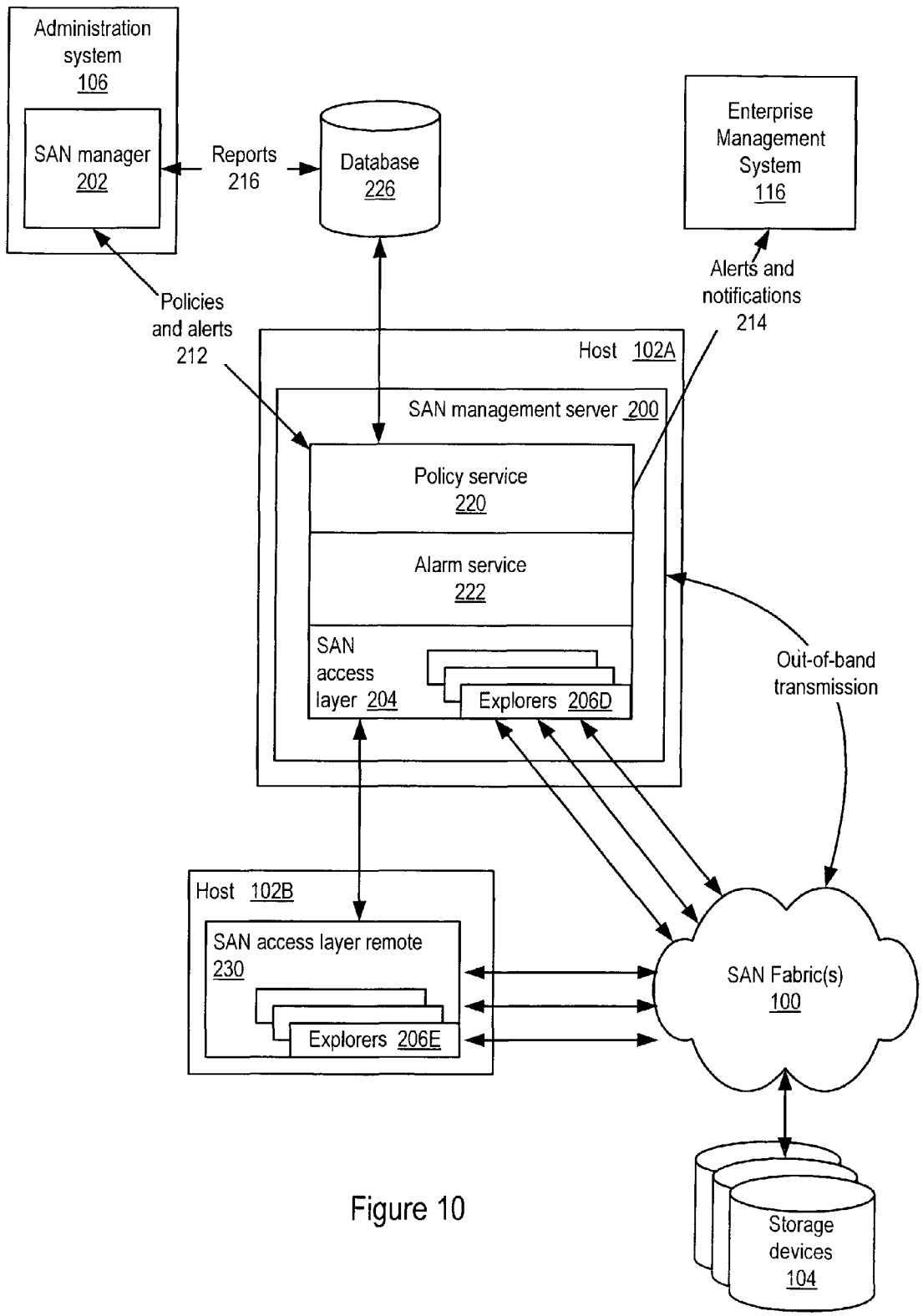
FIG. 10 illustrates an exemplary SAN including a SAN management system and further illustrates the architecture and operation of the SAN management system according to one embodiment.

FIG. 10 illustrates an exemplary SAN and further illustrates the architecture and operation of the SAN management system according to one embodiment. This embodiment may be based on a distributed client-server architecture, and may be divided into components which may include a SAN manager 202, a SAN management server 200, a SAN access layer 204 and a database 226. In this embodiment, SAN access layer 204 may be a component or "layer" of SAN management server 200. SAN management server 200 may also include a policy service 220 and an alarm service 222.

In one embodiment, one or more explorers 206D may be included within SAN access layer 204. In one embodiment, SAN access layer 204 may aggregate information gathered by explorers 206D into a SAN access layer 204 data store. Once the SAN is discovered, SAN access layer 204 may periodically examine the SAN for objects that are added, objects that are removed, and connections that are pulled. In one embodiment, new explorers 206 may be added as needed or desired. For example, if a new type of SAN device is added to the SAN, or an existing type of SAN device is modified or upgraded, an explorer 206 may be added or updated to correctly communicate with the new or updated type of SAN device.

Explorers 206 may use different methods to discover information about heterogeneous SAN objects. In one embodiment, explorers 206 may query objects on the SAN to retrieve a standard set of attributes for each type of object. The terms "information" and "details" may be used to describe the different kinds of data about a SAN that may be discovered, including, but not limited to, SAN events, zone memberships, connectivity, etc. The term "attributes" refers to a subset of that larger body of information. Attributes are details that are particular to a type of object, such as a switch—details such as its vendor, model number, firmware version, port count, World Wide Name (WWN), and out-of-band address.

Explorers 206 may be categorized into types including, but not limited to, switch explorers, zoning explorers, disk array explorers, and Host Bus Adapter (HBA) explorers. Switch explorers may discover switch information such as vendor name, firmware version, and model name. Switch explorers may include, but are not limited to, a management server explorer and an out-of-band switch explorer. A management server explorer may communicate with supported switches over Fibre Channel connections. In one embodiment, the management server explorer may use the Fibre Channel Common Transport (CT) protocol to communicate with switches in fabric 100. The management server explorer may, for example, discover switches in-band over Fibre Channel, obtain switch characteristics, and/or explore port connectivity. In one embodiment, the management server explorer may optionally run over IP networks. For some switches, the management server explorer may run out-of-band. In one embodiment, the management server explorer may perform in-band zoning.

One embodiment may include an out-of-band switch explorer to communicate with switches (or their proxies) over Ethernet. In one embodiment, the out-of-band switch explorer may discover devices managed over any IP network. In one embodiment, the out-of-band switch explorer may use SNMP (Simple Network Management Protocol). SNMP is a protocol for monitoring and managing systems and devices in a network. The data being monitored and managed is defined by a MIB (Management Information Base), the specification and formal description of a set of objects and variables that can be read and possibly written using the SNMP protocol. Some embodiments may use other network protocols, for example Common Management Information Protocol (CMIP), Remote Monitoring (RMON), etc. Enabling the out-of-band switch explorer may include specifying IP addresses for each switch (or for multiple switch fabrics, each proxy) in a SAN access layer configuration file.

Zoning explorers may be used as an interface for SAN access layer 204 to communicate with fabric switches to perform discovery and control of zones in the SAN.

When users issue zoning commands, SAN access layer 204 may use a zoning explorer to contact the switch to perform the zoning operation. In one embodiment, zoning explorers may communicate with the switches out-of-band. Embodiments may provide zoning explorers specific to fabric switches provided by various switch vendors. In one embodiment, one or more zoning explorers may complete transactions with a switch management server (name server) to discover zone names and attributes and to perform switch zoning commands.

HBA explorers may discover information about SAN-connected storage devices 104 that are zoned to a host 102 that is running a SAN management server 200 or where a SAN access layer remote 230 (described below) resides. The HBA explorer may interact with a host 102 to discover HBAs and device paths. A device path may be defined as a route through an interconnect that allows two or more devices to communicate. In one embodiment, an HBA explorer may not discover locally attached storage (e.g. disks or other devices attached through a SCSI or IDE controller). If these storage devices have OS handles, then the HBA explorer may return LUN names and attributes. An OS handle may be used by the operating system to identify a storage resource (known as an Addressable Unit, or AU), and the correct methods (e.g. driver/system call) to access the storage resource. If no OS handles are available, then the HBA explorer may identify the device as a generic device (a block device attached to a port on the host).

Disk array explorers may provide information about array names and their attributes, such as number of ports and the number of disks contained in an array. Disk array explorers may discover disk arrays/enclosures and their LUNs. Disk array explorers may pass LUN management commands to the array's management interface (e.g. CCS or SYMCLI) to execute. In one embodiment, disk array explorers may discover LUNs that are not masked to discovered hosts. SAN access layer 204 may include disk array explorers specific to disk arrays of various vendors. In one embodiment, disk array explorers may start when SAN access layer 204 starts. In one embodiment, the disk array explorers may check to see if host 102 has a management interface. If host 102 does not have the management interface, the corresponding explorer may be disabled. If the management interfaces are present, the explorers may determine if the host has access to any LUNs exported by the array. If any LUNs are available, the explorers may attempt to discover the array using the OS handle of the LUN. In one embodiment, some disk array explorers may use an out-of-band network protocol such as SNMP to communicate directly with the disk array controller. IP addresses for each disk array may be supplied for SAN access layer 204 discovery and communication. In one embodiment, SAN access layer 204 may communicate with a disk array through the array's management interface. In one embodiment, the array vendor's management software is installed on a host 102 with an in-band connection to the arrays to be managed. The management software may provide a unified interface/command interpreter between the SAN management system and the arrays on the fabric. In one embodiment, a SAN management server 200 or a SAN access layer remote 230 is installed on the host 102 that is running the management software in order to communicate with the arrays.

In one embodiment, SAN access layer 204 may automatically discover information for each Addressable Unit (LUN) that is under the control of a volume manager. In one embodiment, SAN management server 200 may discover information about HBAs on other hosts 102 attached to fabrics 100 discovered by SAN management server host 102A.

One embodiment may include a SAN access layer remote 230 that may be installed on one or more other hosts 102 in the SAN, if any, to assist SAN management server 200 in discovering the entire SAN. In one embodiment, SAN access layer remote 230 may be installed on every host 102 on the SAN (excepting the host including the SAN access layer 204) to provide complete and accurate discovery. In one embodiment, each installation of SAN access layer remote 230 may include one or more explorers 206E. In one embodiment, explorers 206E may include one or more explorers 206 that may also be used by SAN access layer 204, such as a management server explorer and an HBA explorer. In one embodiment, explorers 206E may also include an out-of-band switch explorer. In one embodiment, SAN access layer 204 and each installation of SAN access layer remote 230 may each include a set of one or more explorers 206 that may be determined by the discovery requirements and/or contents of the region of the SAN visible to the host 102 on which SAN access layer 204 or the installation of SAN access layer remote 230 resides. Each installation of SAN access layer remote 230 may provide information gathered by explorers 206E to SAN access layer 204, which may aggregate this information into SAN access layer 204 data store. In one embodiment, SAN management server 200 communicates with SAN access layer remote(s) 230 across an HTTP connection. In one embodiment, SAN management server 200 may use XML to communicate with SAN access layer remote(s) 230. Other embodiments may use other connections and other communications protocols.

In one embodiment, to get detailed information about a remote host 102, SAN access layer remote 230 may be installed on the host 102, and the host 102 may be added to a SAN access layer configuration file on SAN management server 200. In one embodiment, a host 102 running SAN access layer remote 230 may be specified as either a "Host" or an "In-Band Host" in the SAN access layer configuration file. The "Host" entry may be used to define other hosts 102 attached to the SAN. The "In-Band Host" entry may be used to define at least one SAN access layer remote host 102 per each fabric 100 that is not attached to and thus not discovered by SAN management server 200. In one embodiment, if SAN access layer remote 230 is not installed on a host 102, SAN management server 200 may still discover the HBA, and the enclosure utility may be used to accurately visualize the host in SAN manager 202's user interface.

In one embodiment, policy-based management may enable the monitoring of conditions on a SAN and may facilitate quick response when problems occur. Conditions that may be monitored may fall into one or more categories of interest to storage administrators. Embodiments may use one or more methods for monitoring conditions on a SAN. These methods may include, but are not limited to, out-of-band polling (e.g. SNMP polling), traps (e.g. SNMP traps) and SAN access layer 204. SAN access layer 204 may provide notification of SAN events such as the addition or deletion of SAN components such as SAN fabrics, switches and arrays. One embodiment may monitor conditions in-band, e.g. using the Fibre Channel Common Transport (CT) protocol.

Among other SAN monitoring methods, SAN management server 200 may receive SNMP traps from elements on the SAN. To monitor conditions on a SAN using SNMP traps, some SAN objects may send SNMP traps to SAN management server 200 when an event happens. SNMP-capable devices on the SAN may be configured to send traps to the host 102A running SAN management server 200. In one embodiment, these traps are asynchronous, so the SAN management system cannot poll such an object to determine the current condition. This embodiment may be dependent on the trap sender to report when a condition changes by sending additional traps. In another embodiment, objects may be polled directly to determine the current condition. In one embodiment, to monitor an object on a SAN, the object may include an SNMP agent that is configured to accept SNMP polls and to send SNMP traps.

One embodiment may include collectors. A collector may be a path or channel through which a specific type of data is gathered for a specific object type. Collectors may include one or more of, but are not limited to, collectors for object availability, environmental conditions, device errors, and SAN traffic. Collectors may monitor properties such as switch port status, dropped frames, disk temperature, link failures and so on, which may be evaluated by policy service 220 to create an accurate composite status of the SAN. In one embodiment, the status of devices may be displayed on a topology map of a SAN manager 202 user interface, for example using color-coded icons. In one embodiment, these collectors may be based on devices' SNMP MIB variables. One embodiment may include one collector per data type per object, for each object that can be monitored. In one embodiment, each collector may be associated with an object type, such as a SAN host 102 or a switch port. In one embodiment, each collector may be associated with a type of data, for example textual state or numeric threshold data. Collector data may be used in real-time collector graphs, the policy engine, and the SAN reporter, for example.

One embodiment may include a policy service 220 that manages policies associated with objects on the SAN. Policies may be rules used to help manage a SAN by automating responses to certain events and conditions. Policies may detect when something goes wrong, and may be used to anticipate and handle problems before they occur. A policy may indicate a particular object or type of object to monitor. In general, any object for which at least one collector is provided may be monitored. Objects that may be monitored include, but are not limited to, fabrics 100, switches, switch ports, hosts 102, and disk arrays. One embodiment may include a set of policies that monitor SAN management server 200. A policy may include a description of a condition to monitor on an object, such as a high percentage of bandwidth utilization on a switch port, and a set of actions to take when that condition is met. A policy may indicate one or more actions to be taken when the condition is detected. In one embodiment, policy service 220 may be integrated with SAN manager 202, permitting users to view what policies are in effect on their SAN, to define and modify policies, and to generate inventory and performance reports based on the conditions monitored by policy service 220. In one embodiment, SAN manager 202 may include a policy utility to facilitate policy creation and maintenance. The policy utility may lead a user through the steps of providing the information described above to create user-defined policies. The user may use the policy utility to make changes in predefined or user-defined policies as desired.

One embodiment may include a policy engine that performs the instructions described in all policies enabled on the SAN. In one embodiment, the policy engine may be a component or process of policy service 220. When the objects on the SAN are discovered, collectors corresponding to the objects may be determined and the relevant collectors may be registered with the policy engine. The policy engine then may receive a stream or streams of real-time collector data and compare data values with the conditions described in its policies. When the alarm condition for a particular policy is met, the policy engine performs the actions described in the policy.

An alarm is a signal that is generated by a policy when the condition specified in the policy is detected or evaluated as true. An alarm may be triggered if the condition and alarm action are configured in the policy. An alarm is an internal signal used by the SAN management system. An alert to SAN manager 202 is a configurable response that may result from an alarm being triggered. When an alarm is triggered, the alarm may be referred to as active. In one embodiment, alarms may be dynamic—the alarm resets itself automatically when the condition monitored by the policy returns to a specified "clear state." The clear state for a condition may specified either manually or automatically, depending on whether the condition is a threshold or a textual comparison condition. One embodiment may include an alarm service 222 that may monitor and collect status and performance information from the SAN using both out-of-band (e.g., SNMP) and SAN access layer 204 events. This collector information may be fed into policy service 220 to trigger policy actions and for logging for reporting purposes. In one embodiment, data collected by the alarm service may be logged in database 226.

The conditions available for a policy may be determined by the type of object being monitored. Different types of policy conditions may result in different types of alarms. There may be different types of conditions for various objects managed by SAN management server 200. One type of policy is a threshold condition with action policy which may be used to monitor an object and detect when a particular numeric threshold is reached and sustained for a configurable period. Another type of policy is a text comparison condition with action policy that may be used to evaluate a textual state to determine the status or condition of the resource.

For every policy, one or more actions to be taken when the specified condition is detected may be configured. Actions may, for example, perform corrective and/or notification functions. One type of policy action is a console alert, which may send an alert to SAN manager 202 when the specified condition is detected. The desired level of severity associated with the action may be configurable. Another type of policy action is a command or script (e.g., a PERL script) that executes a command or executable file specified for the action. Yet another type of policy action is to send e-mail notification to one or more specified recipients. In one embodiment, policy service 220 may be configured to send traps (e.g. SNMP traps) as notifications to applications. In one embodiment, policy action options may also include paging and Instant Messaging.

In one embodiment specific hardware alerts may be forwarded to alert on the applications that will be affected by the hardware problems. In one embodiment application alerts and/or hardware alerts may be forwarded to create alerts for specific departments. This may preferably provide a top-down alert hierarchy.

In one embodiment, SAN manager 202 may serve as a centralized point from which a SAN administrator or other user may create and manage groups of SAN objects, including groups of heterogeneous components. One embodiment may provide a group utility for creating and managing logical groups of SAN objects including hosts 102, storage device 104 interconnects, other groups, and other objects that may be members of a group. A group may be defined as an arbitrary set of SAN elements defined by an administrator to help organize and provision resources, and may be implemented by storage administrators to identify and manually provision available storage devices 104 that match the quality of service requirements of particular user groups or applications. The group utility may be used to create logical storage groups where device membership may be based on zoning, LUN masking, hosts etc., and may also be based on the need for a collection of devices to be viewed as one entity for activities such as reporting, configuring and monitoring SAN resources.

One embodiment may support one or more types of groups, including, but not limited to, generic groups, storage accounts, and storage groups. In one embodiment, groups may be nested within other groups. Generic groups may include switches, hosts 102, storage devices 104, and/or nested groups of any group type. Storage accounts may include hosts 102, storage devices 104, and/or nested groups (storage accounts or storage groups only). A storage account may include one or more host objects and all the storage that the administrator assigns to them. Storage groups may include storage devices 104 and/or nested groups (storage groups only). Storage groups may be used to categorize storage resources by quality of service criteria including, but not limited to, cost, performance, capacity and location.

A zone is a set of objects within a SAN fabric that can access one another. By creating and managing zones, the user may control host 102 access to storage resources. One embodiment may provide methods to enforce the access restrictions created by zones on the SAN. These may include methods that correspond to the forms of zoning commonly referred to as soft zoning and hard zoning. Soft zoning, also called advisory zoning, may be enforced simply by filtering the visibility of objects on the SAN so that an object can only see other objects that share at least one zone membership with the object. In hard zoning, a Fibre Channel switch may actively block access to zone members from any objects outside the zone. This may be performed at the level of ports on the switch. Hard zoning may also be referred to as switch port zoning.

One embodiment may support the zoning of objects on the SAN including, but not limited to, switch ports, hosts 102, and storage devices 104. One embodiment may support switch zoning though application program interfaces (APIs) provided by switch vendors, allowing for both hard and soft zoning. In one embodiment, SAN manager 202 may serve as a centralized point from which a user may access SAN management system and/or third-party services, tools, applications, and/or utilities to create and manage zones on the SAN, including zones containing heterogeneous SAN objects. There may be no industry-wide standard for zoning, and different vendors' switches may implement switch zoning in different ways. Thus, one embodiment may use a switch-neutral approach to zoning. One embodiment may provide a zone utility that may facilitate the creation, modification, and deletion of zones. The zone utility may provide storage zone definition, creation and management. The zone utility may be used to administer zones directly and visually; and may reduce or remove the need to use telnet commands or proprietary, hardware-specific Web-based solutions. The zone utility may automatically filter the list of objects on the SAN and present a list of objects that are available to be added to a zone.

One embodiment may integrate storage masking from various array providers to hosts 102 in the SAN. LUN (Logical Unit Number) security is the collective name given to the operations involved in making storage device 104 resources available to hosts 102 on a SAN, and may include LUN locating or searching, LUN binding, LUN masking, and fabric zoning. In one embodiment, LUN security may provide granular control over host 102 access to individual LUNs within an array or other collection of potentially heterogeneous storage devices.

One embodiment may provide a LUN security utility that may provide a central point from which to perform LUN security operations including LUN binding (the creation of access paths (LUNs) between Addressable Units within a disk array and ports on the array), LUN masking (enabling access to Addressable Units for host HBA ports) and fabric zoning (allowing the host to see the AU and create an Operating System (OS) handle for it). In one embodiment, the LUN security utility may be provided through the SAN manager. In one embodiment, the LUN security utility may guide the user through configuring LUN security operations and allow the user to execute the configured LUN security operations with a single operation, for example, a single click of a button in the user interface. LUN security operations configured and initiated using the LUN security utility may be viewed as transactions. A transaction may be defined as a sequence of information exchange and related work that is treated as a unit for the purposes of satisfying a request and for ensuring data integrity. For a transaction to be completed and changes to be made permanent, a transaction has to be completed in its entirety.

One embodiment may provide a LUN query tool that may be used to search for and find LUNs on the SAN that match one or more properties, such as device vendor, storage type, capacity, configuration, cost, and location. The LUN query tool may return a list of all LUNs that meet those requirements. In one embodiment, the LUN query tool may be launched in context from another utility such as a zone utility or a LUN security utility. One embodiment may provide a mechanism for users to manually create objects such as storage enclosures, hosts and generic devices in the SAN access layer data store from SAN manager 202 to represent undiscoverable SAN elements. One embodiment may provide a mechanism for a user to manually enter customized attributes for heterogeneous SAN objects.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A storage area network (SAN), comprising:
a plurality of SAN components comprising:
a plurality of storage devices;
a plurality of storage device ports;
one or more host systems;
one or more Host Bus Adapters (HBAs); and
a plurality of HBA ports;
a SAN fabric comprising a plurality of switches each comprising a plurality of switch ports configured for coupling the host systems to the storage devices;
a system configured to implement a virtual fabric utility, wherein the virtual fabric utility is configured to:
select one or more of the SAN components for assignment to a virtual fabric on the SAN fabric;
automatically determine one or more of the switch ports of one or more of the switches which are coupled to the selected one or more SAN components; and
add the determined one or more switch ports of the one or more switches to the virtual fabric.

2. The SAN as recited in claim 1, wherein the virtual fabric and one or more of the plurality of SAN components coupled to switch ports in the virtual fabric form a virtual SAN within the SAN.

3. The SAN as recited in claim 1, wherein the virtual fabric utility is further configured to provide a user interface for creating virtual fabrics and for selecting SAN components for assignment to the virtual fabrics.

4. The SAN as recited in claim 1, wherein the system is further configured to implement a SAN manager of a SAN management system, wherein the SAN manager is configured to provide a user interface to the SAN management system for discovering and managing the plurality of SAN components and the plurality of switches, and wherein the virtual fabric utility is configured to be accessed through the SAN manager.

5. A storage area network (SAN), comprising:
a plurality of SAN components comprising:
a plurality of storage devices; and
one or more host systems;
a SAN fabric comprising a plurality of heterogeneous switches each comprising a plurality of switch ports configured for coupling the host systems to the storage devices, wherein two or more of said plurality of heterogeneous switches have different management interfaces;
a system configured to implement a virtual fabric utility, wherein the virtual fabric utility is configured to:
select one or more switch ports of two or more of the heterogeneous switches for assignment to a virtual fabric on the SAN fabric; and
add the selected switch ports to the virtual fabric.

6. The SAN as recited in claim 5, wherein the plurality of SAN components further comprise one or more Host Bus Adapters (HBAs), a plurality of HBA ports, and a plurality of storage device ports, and wherein the virtual fabric and one or more of the plurality of SAN components coupled to switch ports in the virtual fabric form a virtual SAN within the SAN.

7. The SAN as recited in claim 5, wherein the virtual fabric utility is further configured to provide a user interface for creating virtual fabrics and for selecting switch ports for assignment to the virtual fabrics.

8. The SAN as recited in claim 5, wherein the plurality of SAN components further comprise one or more Host Bus Adapters (HBAs), a plurality of HBA ports, and a plurality of storage device ports, and wherein the virtual fabric utility is further configured to display one or more of the SAN components coupled to the switch ports.

9. The SAN as recited in claim 5, wherein the system is further configured to implement a SAN manager of a SAN management system, wherein the SAN manager is configured to provide a user interface to the SAN management system for discovering and managing the plurality of SAN components and the plurality of switches, and wherein the virtual fabric utility is configured to be accessed through the SAN manager.

10. A system, comprising:
a processor; and
a memory comprising program instructions, wherein the program instructions are executable by the processor to:
select one or more of a plurality of Storage Area Network (SAN) components of a SAN for assignment to a virtual fabric on a fabric of the SAN;
wherein the SAN components comprise a plurality of storage devices, a plurality of storage device ports, one or more host systems, one or more Host Bus Adapters (HBAs), and a plurality of HBA ports;
wherein the SAN fabric comprises a plurality of switches each comprising a plurality of switch ports for coupling the host systems to the storage devices;
automatically determine one or more of the switch ports of one or more of the switches which are coupled to the selected one or more SAN components; and
add the determined one or more switch ports of the one or more switches to the virtual fabric.

11. The system as recited in claim 10, wherein the virtual fabric and one or more of the plurality of SAN components coupled to switch ports in the virtual fabric form a virtual SAN within the SAN.

12. The system as recited in claim 10, wherein the program instructions are further executable by the processor to provide a user interface for creating virtual fabrics and for selecting SAN components for assignment to the virtual fabrics.

13. The system as recited in claim 10, wherein the program instructions are further executable by the processor to implement a SAN manager of a SAN management system, wherein the SAN manager is configured to provide a user interface to the SAN management system for discovering and managing the plurality of SAN components and the plurality of switches.

14. A system, comprising:
a processor;
a memory comprising program instructions, wherein the program instructions are executable by the processor to:
select one or more switch ports of two or more heterogeneous switches of a fabric of a Storage Area Network (SAN) for assignment to a virtual fabric on the SAN fabric, wherein two or more of the heterogeneous switches have different management interfaces;
wherein the SAN fabric comprises a plurality of switches including the two or more heterogeneous switches each comprising a plurality of switch ports configured for coupling one or more host systems of the SAN to storage devices of the SAN; and
add the selected switch ports to the virtual fabric.

15. The system as recited in claim 14, wherein the SAN comprises a plurality of SAN components including the one or more host systems, the storage devices, one or more Host Bus Adapters (HBAs), a plurality of HBA ports, and a plurality of storage device ports, and wherein the virtual fabric and one or more of the SAN components form a virtual SAN within the SAN.

16. The system as recited in claim 14, wherein the program instructions are further executable by the processor to provide a user interface for creating virtual fabrics, for selecting switch ports for assignment to the virtual fabrics, and for adding the selected switch ports to the virtual fabric.

17. The system as recited in claim 14, wherein the SAN comprises a plurality of SAN components including the host systems, the storage devices, one or more Host Bus Adapters (HBAs), a plurality of HBA ports, and a plurality of storage device ports, and wherein the program instructions are further executable by the processor to display one or more of the SAN components coupled to the switch ports on a display device of the system.

18. The system as recited in claim 14, wherein the program instructions are further executable by the processor to implement a SAN manager of a SAN management system, wherein the SAN manager is configured to provide a user interface to the SAN management system for discovering and managing the one or more host systems, the storage devices, and the plurality of switches.

19. A system for creating and managing virtual fabrics comprising switch ports from heterogeneous fabric switches in a fabric of a storage area network (SAN), comprising:
means for determining one or more switch ports of two or more heterogeneous fabric switches of the fabric to be assigned to a virtual fabric on the fabric of the SAN; and
means for adding the determined one or more switch ports of the two or more heterogeneous fabric switches to the virtual fabric, wherein two or more of the heterogeneous switches have different management interfaces.

20. A system for creating and managing virtual fabrics comprising switch ports from fabric switches in a fabric of a storage area network (SAN), comprising:
means for determining one or more of a plurality of components of the SAN to be assigned to a virtual fabric on a fabric of the SAN;
means for determining one or more switch ports of one or more of the fabric switches which are coupled to the selected one or more components of the SAN; and
means for adding the determined one or more switch ports of the one or more fabric switches to the virtual fabric.

21. A method, comprising:
displaying a plurality of switch ports of a plurality of switches of a fabric of a Storage Area Network (SAN), wherein two or more of the switches are heterogeneous switches, wherein two or more of the heterogeneous switches have different management interfaces;
selecting one or more switch ports of two or more of the heterogeneous switches for assignment to a virtual fabric on the fabric; and
adding the selected switch ports to the virtual fabric.

22. The method as recited in claim 21, further comprising:
displaying a plurality of SAN components coupled to the switch ports of the plurality of switches, wherein the SAN components comprise a plurality of storage devices, a plurality of storage device ports, one or more host systems, one or more Host Bus Adapters (HBAs), and a plurality of HBA ports;
wherein said selecting one or more switch ports of two or more of the heterogeneous switches to be assigned to a virtual fabric comprises:
selecting one or more of the SAN components for assignment to the virtual fabric; and
automatically determining the one or more switch ports of the two or more heterogeneous switches which are coupled to the selected one or more SAN components.

23. The method as recited in claim 21, wherein the virtual fabric and one or more of a plurality of SAN components coupled to switch ports in the virtual fabric form a virtual SAN within the SAN.

24. The method as recited in claim 21, wherein said displaying, said selecting, and said adding are performed by a virtual fabric utility implemented by a SAN manager of a SAN management system, wherein the SAN manager is configured to provide a user interface to the SAN management system for discovering and managing a plurality of SAN components and the plurality of switches.

25. A computer-accessible storage medium comprising program instructions, wherein the program instructions are computer-executable to implement:
displaying a plurality of switch ports of a plurality of switches of a fabric of a Storage Area Network (SAN), wherein two or more of the switches are heterogeneous switches, wherein two or more of the heterogeneous switches have different management interfaces;
selecting one or more switch ports of two or more of the heterogeneous switches for assignment to a virtual fabric on the fabric; and
adding the selected switch ports to the virtual fabric.

26. The computer-accessible storage medium as recited in claim 25, wherein the program instructions are further computer-executable to implement:
displaying a plurality of SAN components coupled to the switch ports of the plurality of switches, wherein the SAN components comprise a plurality of storage devices, a plurality of storage device ports, one or more host systems, one or more Host Bus Adapters (HBAs), and a plurality of HBA ports;

wherein, in said selecting one or more switch ports of two or more of the heterogeneous switches to be assigned to a virtual fabric, the program instructions are further configured to implement:
- selecting one or more of the SAN components for assignment to the virtual fabric; and
- automatically determining the one or more switch ports of the two or more heterogeneous switches which are coupled to the selected one or more SAN components.

27. The computer-accessible storage medium as recited in claim 25, wherein the virtual fabric and one or more of a plurality of SAN components coupled to switch ports in the virtual fabric form a virtual SAN within the SAN.

28. The computer-accessible storage medium as recited in claim 25, wherein said displaying, said selecting, and said adding are performed by a virtual fabric utility implemented by a SAN manager of a SAN management system, wherein the SAN manager is configured to provide a user interface to the SAN management system for discovering and managing a plurality of SAN components and the plurality of switches.

* * * * *